US012521385B2

(12) United States Patent
Mack et al.

(10) Patent No.: US 12,521,385 B2
(45) Date of Patent: *Jan. 13, 2026

(54) LYOPHILIZED ORALLY DISINTEGRATING TABLET FORMULATIONS OF D-LYSERGIC ACID DIETHYLAMIDE FOR THERAPEUTIC APPLICATIONS

(71) Applicant: Mind Medicine, Inc., New York, NY (US)

(72) Inventors: Peter Mack, Chapel Hill, NC (US); Timm Trenktrog, Binningen (CH); Dustin Melton, Melbane, NC (US); Bethany Amber Doty, Clayton, NC (US); Jon Schroeder, Madison, WI (US); Lisa Marie Garrett, Swindon (GB)

(73) Assignee: Mind Medicine, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,085

(22) Filed: Dec. 7, 2022

(65) Prior Publication Data

US 2023/0122949 A1  Apr. 20, 2023

Related U.S. Application Data

(63) Continuation of application No. 17/890,133, filed on Aug. 17, 2022.

(60) Provisional application No. 63/234,773, filed on Aug. 19, 2021.

(51) Int. Cl.
| | | |
|---|---|---|
| A61K 9/20 | (2006.01) | |
| A61K 9/00 | (2006.01) | |
| A61K 31/48 | (2006.01) | |
| A61K 47/10 | (2017.01) | |
| A61K 47/22 | (2006.01) | |
| A61K 47/26 | (2006.01) | |
| A61K 47/36 | (2006.01) | |
| A61K 47/60 | (2017.01) | |
| A61K 47/69 | (2017.01) | |

(52) U.S. Cl.
CPC ............ *A61K 31/48* (2013.01); *A61K 9/0056* (2013.01); *A61K 9/20* (2013.01); *A61K 9/2013* (2013.01); *A61K 9/2018* (2013.01); *A61K 9/205* (2013.01); *A61K 9/2054* (2013.01); *A61K 9/2095* (2013.01); *A61K 47/10* (2013.01); *A61K 47/22* (2013.01); *A61K 47/26* (2013.01); *A61K 47/36* (2013.01); *A61K 47/60* (2017.08); *A61K 47/6923* (2017.08)

(58) Field of Classification Search
CPC ........ A61K 31/48; A61K 9/0056; A61K 9/20; A61K 9/2013; A61K 9/2018; A61K 9/205; A61K 9/2054; A61K 9/2095; A61K 47/10; A61K 47/22; A61K 47/26; A61K 47/36; A61K 47/60; A61K 47/6923; A61K 9/2063

See application file for complete search history.

(56) References Cited

U.S. PATENT DOCUMENTS

| | | |
|---|---|---|
| 1,394,233 A | 10/1921 | Stoll |
| 2,090,429 A | 8/1937 | Stoll et al. |
| 2,090,430 A | 8/1937 | Stoll et al. |
| 2,265,207 A | 12/1941 | Stoll et al. |
| 2,438,259 A | 3/1948 | Stroll et al. |
| 2,447,214 A | 8/1948 | Stoll et al. |
| 2,736,728 A | 2/1956 | Pioch |
| 2,774,763 A | 12/1956 | William |
| 2,796,419 A | 6/1957 | Kornfeld et al. |
| 2,809,920 A | 10/1957 | Arthur et al. |
| 2,997,470 A | 8/1961 | Pioch |
| 3,038,840 A | 6/1962 | Boris et al. |
| 3,085,092 A | 4/1963 | Hofmann et al. |
| 3,239,530 A | 3/1966 | Albert et al. |
| 4,371,516 A | 2/1983 | Gregory et al. |
| 4,439,196 A | 3/1984 | Higuchi |
| 4,447,224 A | 5/1984 | DeCant, Jr. et al. |

(Continued)

FOREIGN PATENT DOCUMENTS

| | | |
|---|---|---|
| AU | 1083099 A | 5/2000 |
| CH | 535236 A | 3/1973 |

(Continued)

OTHER PUBLICATIONS

Seager, H. "Drug-delivery Products and the Zydis Fast-dissolving Dosage Form," J. Pharm. Pharmacol., 1998, 50, 375-382. (Year: 1998).*

(Continued)

*Primary Examiner* — Bethany P Barham
*Assistant Examiner* — Judith Marie Kamm
(74) *Attorney, Agent, or Firm* — COOLEY LLP

(57) ABSTRACT

A solid oral immediate release formulation of LSD, wherein the composition is produced by lyophilization of a feedstock in a pre-formed mold to form an orally disintegrating tablet. A method of making a solid oral immediate release formulation of LSD by lyophilizing a flash frozen stock solution of LSD and excipients, including a non-gelling matrix former, filler, and binder in a pre-formed mold, and forming an orally disintegrating tablet. A method of treating an individual by administering a solid oral immediate release formulation of LSD, wherein the composition is produced by lyophilization of a feedstock in a pre-formed mold to form an orally disintegrating tablet and treating the individual.

10 Claims, 2 Drawing Sheets

(56) References Cited

U.S. PATENT DOCUMENTS

| | | | |
|---|---|---|---|
| 4,447,233 | A | 5/1984 | Mayfield |
| 4,475,196 | A | 10/1984 | La Zor |
| 4,486,194 | A | 12/1984 | Ferrara |
| 4,487,603 | A | 12/1984 | Harris |
| 4,925,678 | A | 5/1990 | Ranney |
| 4,959,217 | A | 9/1990 | Sanders et al. |
| 5,167,616 | A | 12/1992 | Haak et al. |
| 5,169,383 | A | 12/1992 | Gyory et al. |
| 5,225,182 | A | 7/1993 | Sharma |
| 5,738,875 | A | 4/1998 | Yarwood et al. |
| 6,063,908 | A | 5/2000 | Salamone et al. |
| 6,476,199 | B1 | 11/2002 | Salamone et al. |
| 6,794,496 | B2 | 9/2004 | Ghoshal et al. |
| 7,157,560 | B2 | 1/2007 | Ghoshal et al. |
| 7,566,549 | B2 | 7/2009 | Ghoshal et al. |
| 8,401,801 | B2 | 3/2013 | Mrazek et al. |
| 9,050,343 | B2 | 6/2015 | Peters et al. |
| 9,192,580 | B2 | 11/2015 | Green et al. |
| 10,098,854 | B2 | 10/2018 | Drevets et al. |
| 10,548,839 | B2 * | 2/2020 | Tian ............ A61K 9/2059 |
| 11,364,221 | B2 | 6/2022 | Liechti |
| 11,367,103 | B2 | 6/2022 | Izrailev et al. |
| 11,697,651 | B2 | 7/2023 | Muratore et al. |
| 11,717,517 | B2 | 8/2023 | Liechti et al. |
| 11,959,929 | B2 | 4/2024 | Liechti et al. |
| 11,963,946 | B2 | 4/2024 | Liechti |
| 12,036,220 | B2 | 7/2024 | Mack et al. |
| 2001/0044118 | A1 | 11/2001 | Ghoshal et al. |
| 2002/0012921 | A1 | 1/2002 | Stanton |
| 2002/0028942 | A1 | 3/2002 | Jacewicz et al. |
| 2003/0143655 | A1 | 7/2003 | McConnell et al. |
| 2004/0122106 | A1 * | 6/2004 | Ohta ............ A61K 47/32 514/630 |
| 2004/0138098 | A1 | 7/2004 | Fein |
| 2004/0228919 | A1 | 11/2004 | Houghton et al. |
| 2006/0039890 | A1 | 2/2006 | Renshaw et al. |
| 2006/0223998 | A1 | 10/2006 | Zhang et al. |
| 2007/0122859 | A1 | 5/2007 | Ghoshal et al. |
| 2007/0248652 | A1 | 10/2007 | Barzilay et al. |
| 2010/0029670 | A1 | 2/2010 | Baettig et al. |
| 2010/0105783 | A1 | 4/2010 | Lee et al. |
| 2010/0203130 | A1 | 8/2010 | Tygesen et al. |
| 2012/0108510 | A1 | 5/2012 | Young et al. |
| 2013/0274764 | A1 | 10/2013 | Baker et al. |
| 2013/0287705 | A1 | 10/2013 | Khan et al. |
| 2014/0274764 | A1 | 9/2014 | Zhu et al. |
| 2014/0302147 | A1 | 10/2014 | Hartman et al. |
| 2017/0157343 | A1 | 6/2017 | Davidson et al. |
| 2017/0253928 | A1 | 9/2017 | Zhu et al. |
| 2017/0258761 | A1 | 9/2017 | Burjak et al. |
| 2018/0036303 | A1 * | 2/2018 | Raz ............ A61K 45/06 |
| 2018/0055791 | A1 | 3/2018 | Nichols et al. |
| 2018/0105876 | A1 | 4/2018 | Singh |
| 2018/0228797 | A1 | 8/2018 | Bosse et al. |
| 2019/0142851 | A1 | 5/2019 | Chadeayne |
| 2019/0350949 | A1 | 11/2019 | Küçüksen et al. |
| 2020/0085816 | A1 | 3/2020 | Raz |
| 2020/0101041 | A1 | 4/2020 | Kleidon |
| 2020/0222656 | A1 | 7/2020 | Rustick |
| 2020/0323795 | A1 | 10/2020 | Glue et al. |
| 2020/0390755 | A1 | 12/2020 | Wang et al. |
| 2020/0397752 | A1 | 12/2020 | Perez Castillo et al. |
| 2021/0015738 | A1 * | 1/2021 | LaRosa ............ A61K 31/4045 |
| 2021/0085671 | A1 | 3/2021 | Chadeayne |
| 2021/0137908 | A1 | 5/2021 | Kristensen et al. |
| 2021/0172016 | A1 | 6/2021 | Fefekos et al. |
| 2021/0251976 | A1 | 8/2021 | Stamets |
| 2021/0267977 | A1 | 9/2021 | Liechti |
| 2021/0315884 | A1 | 10/2021 | Liechti et al. |
| 2021/0322447 | A1 | 10/2021 | Plakogiannis et al. |
| 2021/0346341 | A1 | 11/2021 | Liechti |
| 2021/0386704 | A1 | 12/2021 | Liechti et al. |
| 2021/0407643 | A1 | 12/2021 | Liu et al. |
| 2022/0096429 | A1 | 3/2022 | Liechti |
| 2022/0096504 | A1 | 3/2022 | Blumstock et al. |
| 2022/0128580 | A1 | 4/2022 | Liechti et al. |
| 2022/0143051 | A1 | 5/2022 | Manfredi et al. |
| 2022/0273628 | A1 | 9/2022 | Liechti et al. |
| 2022/0273644 | A1 | 9/2022 | Ribeiro et al. |
| 2022/0280501 | A1 | 9/2022 | Liechti et al. |
| 2022/0304980 | A1 | 9/2022 | Arnold et al. |
| 2022/0347169 | A1 | 11/2022 | Liechti et al. |
| 2022/0347195 | A1 | 11/2022 | Barrow et al. |
| 2022/0348575 | A1 | 11/2022 | Levy et al. |
| 2022/0354831 | A1 | 11/2022 | Barrow et al. |
| 2022/0362237 | A1 | 11/2022 | Barrow et al. |
| 2022/0395499 | A1 | 12/2022 | Karlin et al. |
| 2023/0026731 | A1 | 1/2023 | Kochinke et al. |
| 2023/0039395 | A1 | 2/2023 | Liechti et al. |
| 2023/0059204 | A1 | 2/2023 | Plakogiannis et al. |
| 2023/0064429 | A1 | 3/2023 | Mack et al. |
| 2023/0075847 | A1 | 3/2023 | Mack et al. |
| 2023/0088860 | A1 | 3/2023 | Muratore et al. |
| 2023/0107398 | A1 | 4/2023 | Mack et al. |
| 2023/0116703 | A1 | 4/2023 | Kruegel |
| 2023/0201160 | A1 | 6/2023 | Liechti |
| 2023/0210762 | A1 | 7/2023 | Ameri et al. |
| 2023/0218532 | A1 | 7/2023 | Mack et al. |
| 2023/0219955 | A1 | 7/2023 | Sheshbaradaran et al. |
| 2023/0248705 | A1 | 8/2023 | Gobbi et al. |
| 2023/0285384 | A1 | 9/2023 | Liechti et al. |
| 2023/0285386 | A1 | 9/2023 | Mack et al. |
| 2023/0286975 | A1 | 9/2023 | Grill |
| 2023/0301985 | A1 | 9/2023 | Barrow et al. |
| 2023/0330085 | A1 | 10/2023 | Liechti et al. |
| 2023/0346645 | A1 | 11/2023 | Barrow et al. |
| 2023/0414583 | A1 | 12/2023 | Trachsel et al. |
| 2024/0041860 | A1 | 2/2024 | Dolen et al. |
| 2025/0152565 | A1 | 5/2025 | Liechti et al. |
| 2025/0312309 | A1 | 10/2025 | Trachsel et al. |

FOREIGN PATENT DOCUMENTS

| | | |
|---|---|---|
| DE | 202020105085 U1 | 11/2020 |
| EP | 0816364 A1 | 1/1998 |
| EP | 1148339 A2 | 10/2001 |
| FR | 1338023 A | 9/1963 |
| GB | 579484 A | 8/1946 |
| JP | 2018503677 A | 2/2018 |
| TW | 201718490 A | 6/2017 |
| WO | WO-0021930 | 4/2000 |
| WO | WO-2006010587 A1 | 2/2006 |
| WO | WO-2006046417 A1 | 5/2006 |
| WO | WO-2006128658 A1 | 12/2006 |
| WO | WO-2008116024 A2 | 9/2008 |
| WO | WO-2009068214 A2 | 6/2009 |
| WO | WO-2010033392 A2 | 3/2010 |
| WO | WO-2014059197 A1 | 4/2014 |
| WO | WO-2016145193 A1 | 9/2016 |
| WO | WO-2017027678 A1 | 2/2017 |
| WO | WO-2018135943 A1 | 7/2018 |
| WO | WO-2018195455 A1 | 10/2018 |
| WO | WO-2019079742 A1 | 4/2019 |
| WO | WO-2019081764 A1 | 5/2019 |
| WO | WO-2019246532 A1 | 12/2019 |
| WO | WO-2020157569 A1 | 8/2020 |
| WO | WO-2020169850 A1 | 8/2020 |
| WO | WO-2020181194 A1 | 9/2020 |
| WO | WO-2020212948 A1 | 10/2020 |
| WO | WO-2020212951 A1 | 10/2020 |
| WO | WO-2020216832 A1 | 10/2020 |
| WO | WO-2020232255 A1 | 11/2020 |
| WO | WO-2021003467 A1 | 1/2021 |
| WO | WO-2021019023 A1 | 2/2021 |
| WO | WO-2021030571 A1 | 2/2021 |
| WO | WO-2021173273 A1 | 9/2021 |
| WO | WO-2021175816 A1 | 9/2021 |
| WO | WO-2021211358 A1 | 10/2021 |
| WO | WO-2021225796 A1 | 11/2021 |
| WO | WO-2021243461 A1 | 12/2021 |
| WO | WO-2021257169 A1 | 12/2021 |
| WO | WO-2021259962 A1 | 12/2021 |
| WO | WO-2021262871 A1 | 12/2021 |
| WO | WO-2022008627 A2 | 1/2022 |

(56) References Cited

FOREIGN PATENT DOCUMENTS

| | | |
|---|---|---|
| WO | WO-2022023812 A1 | 2/2022 |
| WO | WO-2022023813 A1 | 2/2022 |
| WO | WO-2022030571 A1 | 2/2022 |
| WO | WO-2022084892 A1 | 4/2022 |
| WO | WO-2022107095 A1 | 5/2022 |
| WO | WO-2022115796 A1 | 6/2022 |
| WO | WO-2022175821 A1 | 8/2022 |
| WO | WO-2022189907 A1 | 9/2022 |
| WO | WO-2022221942 A1 | 10/2022 |
| WO | WO-2022226408 A1 | 10/2022 |
| WO | WO-2022232093 A1 | 11/2022 |
| WO | WO-2022235500 A1 | 11/2022 |
| WO | WO-2022235529 A1 | 11/2022 |
| WO | WO-2022235531 A1 | 11/2022 |
| WO | WO-2022246572 A1 * 12/2022 ........... A61K 31/135 | |
| WO | WO-2022261058 A1 | 12/2022 |
| WO | WO-2022265878 A1 | 12/2022 |
| WO | WO-2023283386 A2 | 1/2023 |
| WO | WO-2023012524 A2 | 2/2023 |
| WO | WO-2023023182 A1 | 2/2023 |
| WO | WO-2023023192 A1 | 2/2023 |
| WO | WO-2023043870 A1 | 3/2023 |
| WO | WO-2023107966 A1 | 6/2023 |
| WO | WO-2023108277 A1 | 6/2023 |
| WO | WO-2023114529 A2 | 6/2023 |
| WO | WO-2023115006 A1 | 6/2023 |
| WO | WO-2023183618 A1 | 9/2023 |
| WO | WO-2023212244 A1 | 11/2023 |
| WO | WO-2023250298 A1 | 12/2023 |
| WO | WO-2024033910 A1 | 2/2024 |
| WO | WO-2024091506 A2 | 5/2024 |
| WO | WO-2024229454 A2 | 11/2024 |
| WO | WO-2024238035 A1 | 11/2024 |
| WO | WO-2024263978 A1 | 12/2024 |
| WO | WO-2025128594 A1 | 6/2025 |

OTHER PUBLICATIONS

Am Ende et al. "Improving the Content Uniformity of a Low-Dose Tablet Formulation Through Roller Compaction Optimization," Pharmaceutical Development and Technology (2007) 12:391-404.
Anonymous: "Is Spray Drying a Viable Alternative to Lyophilization?", Pharmtech, Dec. 16, 2009 (Dec. 16, 2009), XP093037970, Retrieved from the Internet: URL: https://www.pharmtech.com/view/spray-drying-viable-alternative-lyophilization [retrieved on Apr. 6, 2023], 3 pages.
Bandari et al., "Orodispersible tablets: An overview" Asian J Pharm (2008) 2(1):2-11.
Berthoumieu et al., "Tabletting study for ODT's" Manufacturing Chemist (2010) Nov., 24-7. 14 pages.
Bhaskar et al. "A Review on Formulation Approaches in Immediate Release Tablet," Journal of Drug Delivery & Therapeutics (2018) 8(3):153-161.
Celestino et al. "Rational use of antioxidants in solid oral pharmaceutical preparations," Brazilian Journal of Pharmaceutical Sciences (2012) vol. 48, No. 3, Jul./Sep. 11 pages.
Final Office Action for U.S. Appl. No. 17/890,133 mailed May 15, 2024, 28 pages.
Final Office Action for U.S. Appl. No. 18/077,096 mailed Jul. 20, 2023, 28 pages.
Final Office Action for U.S. Appl. No. 18/077,096 mailed Jun. 18, 2024, 26 pages.
Final Office Action for U.S. Appl. No. 18/194,761 mailed Dec. 29, 2023, 15 pages.
Holze et al., "Pharmacokinetics and subjective effects of a novel oral LSD formulation in healthy subjects" Br J Clin Pharmacol (2019) 85:1474-1483.
International Search Report and Written Opinion for International Application No. PCT/US2022/040636 mailed on Dec. 29, 2022, 10 pages.
International Search Report and Written Opinion for International Application No. PCT/US2022/040653 mailed Dec. 19, 2022, 12 pages.
Invitation to Pay Additional fees for International Application No. PCT/US2022/040653, mailed Oct. 18, 2022, 2 pages.
Janga et al., "Photostability Issues in Pharmaceutical Dosage Forms and Photostabilization," AAPS PharmSciTech (2018) vol. 19, No. 1, pp. 48-59.
Liechti et al., "Alterations of consciousness and mystical-type experiences after acute LSD in humans" Psychopharmacology (2017) 234(9-10): 1499-1510.
Mind Medicine, Inc., "A Dose-Finding Study of MM-120 (LSD D-Tartrate) for the Treatment of Anxiety Symptoms" ClinicalTrials.gov ID NCT05407064, version 1, Jun. 1, 2022, 12 pages.
Mind Medicine, Inc., "A Dose-Finding Study of MM-120 (LSD D-Tartrate) for the Treatment of Anxiety Symptoms" ClinicalTrials.gov ID NCT05407064, version 10, Nov. 15, 2022, 15 pages.
Mind Medicine, Inc., "A Dose-Finding Study of MM-120 (LSD D-Tartrate) for the Treatment of Anxiety Symptoms" ClinicalTrials.gov ID NCT05407064, version 11, Nov. 15, 2022, 15 pages.
Mind Medicine, Inc., "A Dose-Finding Study of MM-120 (LSD D-Tartrate) for the Treatment of Anxiety Symptoms" ClinicalTrials.gov ID NCT05407064, version 12, Nov. 17, 2022, 15 pages.
Mind Medicine, Inc., "A Dose-Finding Study of MM-120 (LSD D-Tartrate) for the Treatment of Anxiety Symptoms" ClinicalTrials.gov ID NCT05407064, version 13, Dec. 12, 2022, 16 pages.
Mind Medicine, Inc., "A Dose-Finding Study of MM-120 (LSD D-Tartrate) for the Treatment of Anxiety Symptoms" ClinicalTrials.gov ID NCT05407064, version 14, Jan. 20, 2023, 16 pages.
Mind Medicine, Inc., "A Dose-Finding Study of MM-120 (LSD D-Tartrate) for the Treatment of Anxiety Symptoms" ClinicalTrials.gov ID NCT05407064, version 15, Jan. 27, 2023, 16 pages.
Mind Medicine, Inc., "A Dose-Finding Study of MM-120 (LSD D-Tartrate) for the Treatment of Anxiety Symptoms" ClinicalTrials.gov ID NCT05407064, version 16, Feb. 3, 2023, 16 pages.
Mind Medicine, Inc., "A Dose-Finding Study of MM-120 (LSD D-Tartrate) for the Treatment of Anxiety Symptoms" ClinicalTrials.gov ID NCT05407064, version 17, Feb. 10, 2023, 16 pages.
Mind Medicine, Inc., "A Dose-Finding Study of MM-120 (LSD D-Tartrate) for the Treatment of Anxiety Symptoms" ClinicalTrials.gov ID NCT05407064, version 18, Mar. 15, 2023, 17 pages.
Mind Medicine, Inc., "A Dose-Finding Study of MM-120 (LSD D-Tartrate) for the Treatment of Anxiety Symptoms" ClinicalTrials.gov ID NCT05407064, version 19, Jun. 28, 2023, 17 pages.
Mind Medicine, Inc., "A Dose-Finding Study of MM-120 (LSD D-Tartrate) for the Treatment of Anxiety Symptoms" ClinicalTrials.gov ID NCT05407064, version 2, Jun. 15, 2022, 12 pages.
Mind Medicine, Inc., "A Dose-Finding Study of MM-120 (LSD D-Tartrate) for the Treatment of Anxiety Symptoms" ClinicalTrials.gov ID NCT05407064, version 20, Jul. 28, 2023, 17 pages.
Mind Medicine, Inc., "A Dose-Finding Study of MM-120 (LSD D-Tartrate) for the Treatment of Anxiety Symptoms" ClinicalTrials.gov ID NCT05407064, version 21, Aug. 1, 2023, 17 pages.
Mind Medicine, Inc., "A Dose-Finding Study of MM-120 (LSD D-Tartrate) for the Treatment of Anxiety Symptoms" ClinicalTrials.gov ID NCT05407064, version 22, Sep. 13, 2023, 13 pages.
Mind Medicine, Inc., "A Dose-Finding Study of MM-120 (LSD D-Tartrate) for the Treatment of Anxiety Symptoms" ClinicalTrials.gov ID NCT05407064, version 23, Oct. 25, 2023, 13 pages.
Mind Medicine, Inc., "A Dose-Finding Study of MM-120 (LSD D-Tartrate) for the Treatment of Anxiety Symptoms" ClinicalTrials.gov ID NCT05407064, version 24, Dec. 19, 2023, 13 pages.
Mind Medicine, Inc., "A Dose-Finding Study of MM-120 (LSD D-Tartrate) for the Treatment of Anxiety Symptoms" ClinicalTrials.gov ID NCT05407064, version 3, Aug. 4, 2022, 12 pages.
Mind Medicine, Inc., "A Dose-Finding Study of MM-120 (LSD D-Tartrate) for the Treatment of Anxiety Symptoms" ClinicalTrials.gov ID NCT05407064, version 4, Sep. 11, 2022, 13 pages.
Mind Medicine, Inc., "A Dose-Finding Study of MM-120 (LSD D-Tartrate) for the Treatment of Anxiety Symptoms" ClinicalTrials.gov ID NCT05407064, version 5, Sep. 15, 2022, 13 pages.

(56) References Cited

OTHER PUBLICATIONS

Mind Medicine, Inc., "A Dose-Finding Study of MM-120 (LSD D-Tartrate) for the Treatment of Anxiety Symptoms" ClinicalTrials.gov ID NCT05407064, version 6, Sep. 28, 2022, 14 pages.
Mind Medicine, Inc., "A Dose-Finding Study of MM-120 (LSD D-Tartrate) for the Treatment of Anxiety Symptoms" ClinicalTrials.gov ID NCT05407064, version 7, Oct. 21, 2022, 14 pages.
Mind Medicine, Inc., "A Dose-Finding Study of MM-120 (LSD D-Tartrate) for the Treatment of Anxiety Symptoms" ClinicalTrials.gov ID NCT05407064, version 8, Nov. 2, 2022, 15 pages.
Mind Medicine, Inc., "A Dose-Finding Study of MM-120 (LSD D-Tartrate) for the Treatment of Anxiety Symptoms" ClinicalTrials.gov ID NCT05407064, version 9, Nov. 9, 2022, 15 pages.
Mind Medicine, Inc., "Safety and Efficacy of Low Dose MM-120 for ADHD Proof of Concept Trial" ClinicalTrials.gov ID NCT05200936, version 1, Jan. 7, 2022, 11 pages.
Mind Medicine, Inc., "Safety and Efficacy of Low Dose MM-120 for ADHD Proof of Concept Trial" ClinicalTrials.gov ID NCT05200936, version 2, Jun. 15, 2022, 11 pages.
Mind Medicine, Inc., "Safety and Efficacy of Low Dose MM-120 for ADHD Proof of Concept Trial" ClinicalTrials.gov ID NCT05200936, version 3, Jul. 31, 2023, 11 pages.
Mind Medicine, Inc., "Safety and Efficacy of Low Dose MM-120 for ADHD Proof of Concept Trial" ClinicalTrials.gov ID NCT05200936, version 4, Oct. 24, 2023, 10 pages.
Mind Medicine, Inc., "Safety and Efficacy of Low Dose MM-120 for ADHD Proof of Concept Trial" ClinicalTrials.gov ID NCT05200936, version 5, Jan. 12, 2024, 10 pages.
Mind Medicine, Inc., "Phase I trial: MM-120-101" May 14, 2024, 5 pages.
Mind Medicine, Inc., "Phase I trial: MM-120-102" May 17, 2024, 5 pages.
Moravkar et al., "Application of moisture activated dry granulation (MADG) process to develop high dose immediate release (IR) formulations" Advanced Powder Technology (2017) 28:1270-1280.
NHS, "Swallowing Difficulties in Dementia" NHS Hull University Teaching Hospitals NHS Trust, https://www.hey.nhs.uk/patient-leaflet/swallowing-difficulties-in-dementia, published Mar. 17, 2016. 10 pages.
Nichols, "Psychedelics" Pharmacol Rev. (2016) 68(2):264-355.
Non-Final Office Action for U.S. Appl. No. 17/890,133 mailed Aug. 16, 2023, 14 pages.
Non-Final Office Action for U.S. Appl. No. 17/890,133 mailed Dec. 21, 2023, 23 pages.
Non-Final Office Action for U.S. Appl. No. 18/077,096 mailed Mar. 28, 2023, 20 pages.
Non-Final Office Action for U.S. Appl. No. 18/077,096 mailed Mar. 6, 2024, 33 pages.
Non-Final Office Action for U.S. Appl. No. 18/194,761 mailed Sep. 15, 2023, 20 pages.
Notice of Allowance for U.S. Appl. No. 17/890,133 mailed Aug. 21, 2024, 10 pages.
Notice of Allowance for U.S. Appl. No. 18/194,761 mailed May 14, 2024, 8 pages.
Pacheco et al. "A review on orally disintegrating films (ODFs) made from natural polymers such as pullulan, maltodextrin, starch, and others," International Journal of Biological Macromolecules (2021) vol. 178, pp. 504-513.
Passie et al., "The pharmacology of lysergic acid diethylamide: a review" CNS Neurosci Ther. (2008) 14(4):295-314.
Psychedelic Experience web page retrieved from The Wayback Machine on Apr. 23, 2021, 6 pages.
Sastry et al., "Recent technological advances in oral drug delivery—a review" Pharm Sci Technol Today. (2000) Apr.; 3(4):138-145.
Sharma et al., "Review on Moisture activated Dry Granulation Process," PharmaTutor (2017) 5(12):58-67.

Takasaki et al., "Importance of Excipient Wettability on Tablet Characteristics Prepared by Moisture Activated Dry Granulation (MADG)," International Journal of Pharmaceutics (2013) 456:58-64.
Ullah et al., "Moisture-Activated Dry Granulation-Part I: A Guide to Excipient and Equipment Selection and Formulation Development" Pharmaceutical Technology (2009) vol. 33, Issue 11, 6 pages.
University Hospital, Basel, Switzerland, "Direct Comparison of Altered States of Consciousness Induced by LSD and Psilocybin (LSD-psilo)" ClinicalTrials.gov ID NCT03604744, version 8, Apr. 26, 2021, 11 pages.
University Hospital, Basel, Switzerland, "Psychological, Physiological, Endocrine, and Pharmacokinetic Effects of LSD in a Controlled Study" ClinicalTrials.gov ID NCT01878942, version 7, Jan. 20, 2016, 10 pages.
University Hospital, Basel, Switzerland, "Role of the Serotonin 5-HT2A Receptor in LSD-induced Altered States of Consciousness (LDR-Study) (LDR)" ClinicalTrials.gov ID NCT03321136, version 9, Aug. 26, 2019, 15 pages.
Adams. "Patterns of exploration in rats distinguish lisuride from lysergic acid diethylamide." Pharmacol Biochem Behav, 1985; 23(3): 461-468.
Aghajanian. "Serotonin and Hallucinogens." Neuropsychopharmacology, 1999; 21(2):16S-23S.
Aghajanian. "Serotonin Induces Excitatory Postsynaptic Potentials in Apical Dendrites of Neocortical Pyramidal Cells." Neuropharmacology, 1997; 36(4-5): 589-599.
Aghajanian. "Persistence of lysergic acid diethylamide in the plasma of human subjects." Clin Pharmacol Ther, 1964; 5: 611-614.
Alaka. "Efficacy and safety of duloxetine in the treatment of older adult patients with generalized anxiety disorder: a randomized, double-blind, placebo-controlled trial." International Journal of Geriatric Psychiatry, 2014; 29(9): 978-986.
Alexander. "LSD: Injection early in pregnancy produces abnormalities in offspring in rats." Science, 1967; 157: 459-460.
Alexander. "Lysergic acid diethylamide intake in pregnancy: Fetal damage in rats." J Pharmacol Exp Ther, 1970; 173: 48-59.
Allgulander. "Efficacy of sertraline in a 12-week trial for generalized anxiety disorder." American Journal of Psychiatry, Sep. 2004; 161(9): 1642-1649.
Ansara. "Management of treatment-resistant generalized anxiety disorder." Mental Health Clinician, 2020; 10(6): 326-334.
Ansseau." Controlled comparison of tianeptine, alprazolam and mianserin in the treatment of adjustment disorders with anxiety and depression." Human Psychopharmacology Clinical and Experimental, 1996; 11: 293-298.
Antkiewicz-Michaluk. "$Ca^{2+}$ channel blockade prevents lysergic acid diethylamine-induced changes in dopamine and serotonin metabolism." European Journal of Pharmacology, 1997; 332(1): 9-14.
Appel. "Analyzing mechanism(s) of hallucinogenic drug action with drug discrimination procedures." Neuroscience & Biobehavioral Reviews, 1982; 6(4): 529-536.
Appel. "LSD, 5-HT (serotonin), and the evolution of a behavioral assay." Neuroscience and Biobehavioral Reviews, 2004; 27(8): 693-701.
Auerbach. "Lysergic acid diethylamide: effect on embryos." Science, 1967; 157: 1325-1326.
Axelrod. "The distribution and metabolism of lysergic acid diethylamide." Annals New York Academy of Sciences, 1957; 66(3): 435-444.
Babor. "The Alcohol Use Disorders Identification Test, Guidelines for Use in Primary Care, Second Edition." World Health Organization, Department of Mental Health and Substance Dependence, 2001 [online] https://apps.who.int/iris/bitstream/handle/10665/67205/WHO_MSD_MSB_01.6a.pdf?sequence=1&isAllowed=y (Access Date: Nov. 1, 2021); 41 pages.
Bandelow. "Epidemiology of anxiety disorders in the 21st century." Dialogues in Clinical Neuroscience, 2015; 17(3): 327-335.
Barnett. "Diazepam treatment for L.S.D. intoxication." Lancet, 1971; 2: 270; 1 page.

(56) References Cited

OTHER PUBLICATIONS

Barrett. "Validation of the revised Mystical Experience Questionnaire in experimental sessions with psilocybin." Journal of Psychopharmacology, 2015; 29(11): 1182-1190.
Baumeister. "Classical hallucinogens as antidepressants? A review of pharmacodynamics and putative clinical roles." Therapeutic Advances in Psychopharmacology, 2014; 4(4): 156-169.
Bedard. "The 'wet dog shake' behaviour in the rat and 5 hydroxytryptamine." Proc of the BPS, 1977, 450P-451P; 2 pages.
Ben-Jonathan. "What can we learn from rodents about prolactin in humans?" Endocrine Reviews, 2008; 29(1): 1-41.
Bercel. "Model Psychoses Induced by LSD-25 in Normals: I. Psychophysiological Investigations, with Special Reference to the Mechanism of the Paranoid Reaction." AMA Archives of Neurology and Psychiatry, 1956; 75(6): 588-611.
Berman. "Evaluation of the Drug Use Disorders Identification Test (DUDIT) in criminal justice and detoxification settings and in a Swedish population sample." European Addiction Research, 2005; 11(1): 22-31.
Bershad. "Acute Subjective and Behavioral Effects of Microdoses of Lysergic Acid Diethylamide in Healthy Human Volunteers." Biological Psychiatry, 2019; 86(10): 792-800. doi.org/10.1016/j.biopsych.2019.05.019.
Bershad. "Preliminary report on the effects of a low dose of LSD on resting-state amygdala Functional connectivity." Biol Psychiatry: Cogn Neurosci and Neuroimaging, 2020; 5: 461-467.
Boess. "Interaction of tryptamine and ergoline compounds with threonine 196 in the ligand binding site of the 5-hydroxytryptamine6 receptor." Molecular Pharmacology, 1997; 52: 515-523.
Boess. "Molecular biology of 5-HT receptors." Neuropharmacology, 1994; 33(3/4): 275-317.
Bogenschutz. "Psilocybin-assisted treatment for alcohol dependence: a proof-of-concept study." Journal of Psychopharmacology, Mar. 2015; 29(3): 289-299.
Bonson. "Alterations in responses to LSD in humans associated with chronic administration of tricyclic antidepressants, monoamine oxidase inhibitors or lithium." Behavioural Brain Research, 1996; 73(1-2): 229-233.
BONSON. "Chronic administration of serotonergic antidepressants attenuates the subjective effects of LSD in humans." Neuropsychopharmacology, 1996; 14(6): 425-436.
Boyd. "Preliminary studies of the metabolism of lysergic acid diethylamide using radioactive carbon-marked molecules." Journal of Nervous and Mental Disease, 1955; 122(5): 470-471.
Boyd. "Preliminary Studies on the Metabolism of LSD." In: Cholden L (ed), Proceedings of the Round Table on Lysergic acid diethylamide and mescaline in experimental psychiatry. Grune & Stratton, London, New York, 1956, 57-59; 5 pages.
Boyd. "The metabolism of lysergic acid diethylamide." Archives International Pharmacodyn Ther, 1959; 120: 292-311.
Bretz. "Combining multiple comparisons and modeling techniques in dose-response studies." Biometrics, 2005; 61(3): 738-748.
Bruss. "Hamilton anxiety rating scale interview guide: Joint interview and test-retest methods for interrater reliability." Psychiatry Research , 1994; 53: 191-202.
Buchborn. "Tolerance to lysergic acid diethylamide: Overview, correlates, and clinical implications." Neuropathology of Drug Addictions and Substance Misabuse. vol. 2, Chapter 79, 2016: 846-858.
Bunzow. "Amphetamine, 3,4-methylenedioxymethamphetamine, lysergic acid diethylamide, and metabolites of the catecholamine neurotransmitters are Agonists of a rat trace amine receptor." Molecular Pharmacology, 2001; 60(6): 1181-1188.
Buysse. "The Pittsburgh Sleep Quality Index: a new instrument for psychiatric practice and research." Psychiatry Research, 1989; 28(2): 193-213.
Cai. "Elucidation of LSD in vitro metabolism by liquid chromatography and capillary electrophoresis coupled with tandem mass spectrometry." J Anal Toxicol, 1996; 20: 27-37.
Canezin. "Determination of LSD and its metabolites in human biological fluids by high-performance liquid chromatography with electrospray tandem mass spectrometry." Journal of Chromatography B Biomed Sci Appl, 2001; 765(1): 15-27.
Carhart-Harris. "LSD enhances suggestibility in healthy volunteers." Psychopharmacology (Berl), Feb. 2015; 232(4): 785-794.
Carhart-Harris. "Psilocybin with psychological support for treatment-resistant depression: an open-label feasibility study." Lancet Psychiatry, 2016; 3(7): 619-627.
Carhart-Harris. "The paradoxical psychological effects of lysergic acid diethylamide (LSD)." Psychological Medicine, 2016; 46(7): 1379-1390.
Chinwala, M., "Recent formulation advances and therapeutic usefulness of orally disintegrating tablets (ODTs)", Pharmacy (2020); 8(4): 186; 11 pages. DOI: 10.3390/pharmacy8040186.
Cohen. "Chromosomal Damage in Human Leukocytes Induced by Lysergic Acid Diethylamide." Science, 1967; 155(3768): 1417-1419.
Cohen. "Genetic toxicology of lysergic acid diethylamide (LSD-25)." Mutation Research, 1977; 47(3-4): 183-209.
Cohen. "In vivo and in vitro chromosomal damage induced by LSD-25". New England Journal of Medicine, Nov. 16, 1967; 277(20): 1043-1049.
Cohen. "Meiotic chromosome damage induced by LSD-25." Nature, 1968; 219: 1072-1074.
Collu. "Endocrine effects of chronic administration of psychoactive drugs to prepubertal male rats. II LSD." Canadian Journal of Physiology and Pharmacology, 1975; 53(6): 1023-1026.
Constantin. "Therapeutic Interventions for Adjustment Disorder: A Systematic Review." American Journal of Therapeutics, 2020; 27(4): e375-e386.
Corey. "Chromosome studies on the patients (in vivo) and cells (in vitro) treated with lysergic acid diethylamide." New England Journal of Medicine, 1970; 282(17): 939-943.
Corne. "A possible correlation between drug-induced hallucinations in man and a behavioural response in mice." Psychopharmacologia (Berl.), 1967; 11: 65-78.
Creese. "The dopamine receptor: Differential binding of d-LSD and related agents to agonist and antagonist states." Life Sciences, 1975; 17(11): 1715-1719.
Darke. "A retrospective study of the characteristics and toxicology of cases of lysergic acid diethylamide (LSD)- and psilocybin-related death in Australia." Addiction, 2024; 119: 1564-1571.
Davenport. "Psychedelic and nonpsychedelic LSD and psilocybin for cluster headache." CMAJ, 2016; 188(3): 217; 1 page.
De Gregorio. "d-Lysergic Acid Diethylamide (LSD) as a Model of Psychosis: Mechanism of Action and Pharmacology." International Journal of Molecular Science, 2016; 17(11): 1953; 20 pages.
De Gregorio. "The hallucinogen d -lysergic diethylamide (LSD) decreases dopamine firing activity through $5-HT_{1A}$, $D_2$ and $TAAR_1$ receptors." Pharmacological Research, 2016; 113: 81-91.
Dipaolo. "Evaluation of teratogenicity of lysergic acid diethylamine". Nature, 1968; 220: 490-491.
Dirami. "Effect of a dopamine agonist on the development of Leydig Cell hyperplasia in Sprague-Dawley rats." Toxicology and Applied Pharmacology, 1996; 141: 169-177.
Dishotsky. "LSD and genetic damage." Science, Apr. 30, 1971; 172(3982): 431-440.
Dittrich. "The standardized psychometric assessment of altered states of consciousness (ASCs) in humans." Pharmacopsychiatry, 1998; 3(Suppl 2): 80-84.
Dolder. "Development and validation of a rapid turboflow LC-MS/MS method for the quantification of LSD and 2-oxo-3-hydroxy LSD in serum and urine samples of emergency toxicological cases." Anal Bioanal Chem, 2015; 407: 1577-1584. doi.10.1007/s00216-014-8388-1.
Dolder. "Development and validation of an LC-MS/MS method to quantify lysergic acid diethylamide (LSD), iso-LSD, 2-oxo-3-hydroxy-LSD, and nor-LSD and identify novel metabolites in plasma samples in a controlled clinical trial." Journal of Clinical Lab Analysis, 2018; 32(2): 1-8.

(56) References Cited

OTHER PUBLICATIONS

Dolder. "LSD acutely impairs fear recognition and enhances emotional empathy and sociality." Neuropsychopharmacology, 2016; 41: 2638-2646.
Dolder. "Pharmacokinetics and Concentration-Effect Relationship of Oral LSD in Humans [published correction appears in Int J]." International Journal of Neuropsychopharmacology, Apr. 27, 2016; 19(1): 1-7.
Dolder. "Pharmacokinetics and pharmacodynamics of lysergic acid diethylamide in healthy subjects." Clin Pharmacokinetics, 2017; 56: 1219-1230.
Duerler. "LSD-induced increases in social adaptation to opinions similar to one's own are associated with stimulation of serotonin receptors." Sci Rep, 2020; 10: 12181; 11 pages.
Eells. "Effects of intraocular mescaline and LSD on visual-evoked responses in the rat." Pharmacology Biochemistry & Behavior, 1989; 32: 191-196.
Egan. "Agonist activity of LSD and lisuride at cloned 5-HT2a and 5-HT2c receptors." Psychopharmacology, 1998; 136: 409-414.
Eglen. "The 5-HT7 receptor: orphan found." Trends in Pharmacological Sciences, Apr. 1997; 18(4): 104-107.
Egozcue. "Effect of LSD-25 on mitotic and meiotic chromosomes of mice and monkeys." Humangenetik, 1969; 8: 86-93.
Eleusis Therapeutics, "A Double-blind, Placebo-controlled Study to Evaluate Very Low Dose LSD in Healthy Volunteers Aged 55-75 Years" ClinicalTrials.gov ID NCT04421105, version 1, Jun. 4, 2020, 12 pages.
EMCDDA (European Monitoring Center for Drugs and Drug Addiction). "Statistical Bulletin 2021—prevalence of drug use." [online] https://www.emcdda.europa.eu/data/stats2021/gps_en (Access Date: Nov. 1, 2021); 1 page.
Emerit. "LSD: No chromosomal breakage in mother embryos during rat pregnancy." Teratology, 1972; 6: 71-74.
Erickson. "Severity of anxiety and work-related outcomes of patients with anxiety disorders." Depress and Anxiety, 2009; 26(12): 1165-1171.
Erpelding. "Placebo Response Reduction and Accurate Pain Reporting Training Reduces Placebo Responses in a Clinical Trial on Chronic Low Back Pain." Clinical Journal Pain, 2020; 36(12): 950-954.
Evans. "What can be done to control the placebo response in clinical trials? A narrative review." Contemporary Clinical Trials, 2021; 107: 106503; 8 pages.
Evarts. "Some effects of bufotenine and lysergic acid diethylamide on the monkey." AMA Archives of Neurology and Psychiatry, 1956; 75(1): 49-53.
Examiner Interview Summary for U.S. Appl. No. 17/890,133, by Mack, Peter et al., mailed on Jul. 16, 2024, 3 pages.
Examiner Interview Summary for U.S. Appl. No. 17/890,133, by Mack, Peter et al., mailed on Mar. 19, 2024, 3 pages.
Examiner Interview Summary for U.S. Appl. No. 18/077,085, by Mack, Peter et al., mailed on Jul. 16, 2024, 3 pages.
Examiner Interview Summary for U.S. Appl. No. 18/077,085, by Mack, Peter et al., mailed on Mar. 19, 2024, 3 pages.
Examiner Interview Summary for U.S. Appl. No. 18/077,096, by Mack, Peter et al., mailed on Jun. 8, 2023, 3 pages.
Family. "Safety, tolerability, pharmacokinetics, and pharmacodynamics of low dose lysergic acid diethylamide (LSD) in healthy older volunteers." Psychopharmacology, 2020; 237: 841-853.
Fava. "Major Depressive Disorder." Neuron, 2000; 28: 335-341.
Felix Mueller, "LSD Treatment for Persons With Alcohol Use Disorder (LYSTA)" ClinicalTrials.gov ID NCT05474989, version 1, Jul. 24, 2022, 11 pages.
Fiorella. "The role of the 5-HT2A and 5-HT2C receptors in the stimulus effects of hallucinogenic drugs III: The mechanistic basis for supersensitivity to the LSD stimulus following serotonin depletion." Psychopharmacology, 1995, 121, 364-372.
Ford. "Hallucinogenic Persisting Perception Disorder: A case series and review of the literature." Frontiers in Neurology, May 2022; 13: 878609. 10 pages.

Frank. "Efficacy of interpersonal psychotherapy as a maintenance treatment of recurrent depression." Archives of General Psychiatry, 1991 ;48: 1053-1059.
Freedman. "266-Regional and subcellular distribution of LSD and effects on 5-HT levels." The Pharmacologist, Neurochemistry, Abstracts of Papers for Fall Meeting, Aug. 16-20, 1965; 7(2); 3 pages.
Freedman. "Patterns of tolerance to lysergic acid diethylamide and mescaline in rats." Science, 1958; 127: 1173-1174.
Freedman. "The Psychopharmacology of Hallucinogenic Agents." Annual Review Medicine, 1969; 20(1): 409-418.
Freedman. "Tolerance to behavioral effects of LSD-25 in the rat." J Pharmacol Ex Ther, 1964; 143: 309-313.
Fuentes. "Therapeutic use of LSD in psychiatry: A systematic review of randomized-controlled clinical trials." Front Psychiatry, 2020; 10: 943; 14 pages.
Galanopoulou. "Mesulergine: A review". CNS Drug Reviews, 1999; 5(3): 233-248.
Garakani. "Pharmacology of anxiety disorders: Current and emerging treatment options." Frontiers in Psychiatry, Dec. 2020; 11: 595584; 21 pages.
Gartlehner. "Comparative benefits and harms of second-generation antidepressants for treating major depressive disorder: An updated meta-analysis." Annals of Internal Medicine, 2011; 155(11): 772-785.
Gasser. "Safety and efficacy of lysergic acid diethylamide-assisted psychotherapy for anxiety associated with life-threatening diseases." Journal of Nervous and Mental Disease, 2014; 202(7) :513-520.
Gasser. "LSD-assisted psychotherapy for anxiety associated with a life-threatening disease: a qualitative study of acute and sustained subjective effects." J Psychopharmacol, 2015; 29(1): 57-68.
Geber. "Congenital malformations induced by mescaline, lysergic acid diethylamide and bromolysergic acid in the hamster." Science, 1967; 158: 265-267.
Gerald. "The 5-HT4 receptor: Molecular cloning and pharmacological characterization of two splice variants." EMBO J, 1995; 14: 2806-2815.
Giacomelli. "Lysergic acid diethylamide (LSD) is a partial agonist of D2 dopaminergic receptors and it potentiates dopamine-mediated prolactin secretion in lactotrophs in vitro." Life Sciences, 1998; 63(3): 215-222.
Goetz. "The mutagenic effect of lysergic acid diethylamine I. Cytogenetic analysis." Mutation Res, 1974; 26: 513-516.
Gonzalez-Maeso. "Transcriptome Fingerprints Distinguish Hallucinogenic and Nonhallucinogenic 5-Hydroxytryptamine 2A Receptor Agonist Effects in Mouse Somatosensory Cortex." J Neurosci, 2003; 23(26): 8336-8843.
Goodman. "Treatment of generalized anxiety disorder with escitalopram: pooled results from double-blind, placebo-controlled trials." Journal of Affectivce Disorders, 2005; 87(2-3): 161-167.
Goodwin. "An intravenous self-administration procedure for assessing the reinforcing effects of hallucinogens in nonhuman primates." Journal of Pharmacological and Toxicological Methods, 2016; 82: 31-36.
Graham. "The actions of d-lysergic acid diethylamide (LSD-25). Part I." General pharmacology. J Fac Med Iraq, 1954; 18(1): 1-10.
Greden. "The burden of recurrent depression: Causes, consequences, and future prospects." Journal of Clinical Psychiatry, 2001; 62(suppl 22): 5-9.
Green. "Defining the histamine H2-receptor in brain: the interaction with LSD." NIDA Research Monograph, 1978; 22: 38-59.
Greenberg. "The economic burden of adults with major depressive disorder in the United States (2005 and 2010)." Journal of Clinical Psychiatry, 2015; 76(2): 155-162.
Greiner. "Pharmacotherapy of psychiatric inpatients with adjustment disorder: current status and changes between 2000 and 2016." European Archives of Psychiatry and Clinical Neuroscience, 2020; 270(1): 107-117.
Gresch. "Behavioral tolerance to lysergic acid diethylamide is associated with reduced serotonin-2A receptor signaling in rat cortex." Neuropsychopharmacology, 2005; 30: 1693-1702.

(56) References Cited

OTHER PUBLICATIONS

Griffiths. "Mystical-type experiences occasioned by psilocybin mediate the attribution of personal meaning and spiritual significance 14 months later." J Psychopharmacol, 2008; 22: 621-632.
Griffiths. "Psilocybin produces substantial and sustained decreases in depression and anxiety in patients with life-threatening cancer: A randomized double-blind trial." Journal of Psychopharmacology, 2016; 30(12): 1181-1197.
Grob, C.S et al. (Jan. 2011) Pilot Study of Psilocybin Treatment for Anxiety in Patients with Advanced-Stage Cancer. Arch Gen Psychiatry, 68(1):71-78.
Grof. "LSD-assisted psychotherapy in patients with terminal cancer." International Pharmacopsychiatry, 1973; 8(3): 129-144.
Guy. "ECDEU Assessment Manual for Psychopharmacology. Clinical Global Impressions (CGI)." U.S. Department of Health and Human Services, Public Health Service, Alcohol Drug Abuse and Mental Health Administration, NIMH Psychopharmacology Research Branch, Rockville, MD, 1976, pp. 218-222; 11 pages.
Haden. "LSD Overdoses: Three Case Reports." Journal of Studies on Alcohol and Drugs, Jan. 2020 ;81(1): 115-118.
Halberstadt. "Recent advances in the neuropsychopharmacology of serotonergic hallucinogens." Behavioural Brain Research, 2015; 277: 99-120.
Haley." Brain concentrations of LSD-25 (delysid) after intracerebral or intravenous administration in conscious animals." Experientia, 1957; 13(5): 199-200.
Hanaway. "Lysergic acid diethylamine: Effects on the developing mouse lens." Science, 1969; 164: 574-575.
Hartford. "Duloxetine as an SNRI treatment for generalized anxiety disorder: results from a placebo and active-controlled trial." International Clinical Psychopharmacology, 2007; 22(3): 167-174.
Herdman. "Development and preliminary testing of the new five-level version of EQ-5D (EQ-5D-5L)." Quality of Life Research, 2011; 20(10): 1727-1736.
Hidalgo. "An effect-size analysis of pharmacologic treatments for generalized anxiety disorder." Journal of Psychopharmacology, 2007; 21(8): 864-872.
Hintzen. "The pharmacology of LSD: a critical review." Oxford University Press: Oxford, 2010. pp. 258-259; 2 pages. Abstract Only.
Hirst. "Differences in the central nervous system distribution and pharmacology of the mouse 5-hydroxytryptamine-6 receptor compared with rat and human receptors investigated by radioligand binding, site-directed mutagenesis, and molecular modeling." Molecular Pharmacology, 2003; 64(6): 1295-1308.
Hoff et al. "Allgemeine Gesichtspunkte zur Pharmakopsychiatrie." In: Bradley PB, ed. Neuro-Psychopharmacology. Amsterdam: Elsevier, 1959, pp. 61-70, p. 91, and pp. 326-327, with English translation, 46 pages.
Hoffer. "D-Lysergic acid diethylamide (LSD): A review of its present status." Clin Pharmacol Ther, 1965; 6: 183-255.
Hofmann. "How LSD originated." Journal of Psychedelic Drugs. 1979;11(1-2): 53- 60.
Holze. "Acute dose-dependent effects of lysergic acid diethylamide in a double-blind placebo-controlled study in healthy subjects." Neuropsychopharmacology. 2021; 46(3): 537-544.
Holze. "Distinct acute effects of LSD, MDMA, and D-amphetamine in healthy subjects." Neuropsychopharmacology, 2020; 45(3): 462-471.
Holze. "Lysergic Acid Diethylamide-Assisted Therapy in patients with anxiety with and without a life-threatening illness: a randomized, double-blind, placebo-controlled Phase II study." Biological Psychiatry, 2023; 93(3): 215-223.
Holze. "Pharmacokinetics and Pharmacodynamics of Lysergic Acid Diethylamide Microdoses in Healthy Participants." Clinical Pharmacology & Therapeutics, Mar. 2021; 109(3): 658-666.
Hutten, "Low doses of LSD acutely increase BDNF blood plasma levels in healthy volunteers." ACS Pharmacology & Transitional Science Journal, 2021; 4(2): 461-466.
Hutten. "Mood and cognition after administration of low LSD doses in healthy volunteers: A placebo controlled dose-effect finding study." European Neuropsychopharmacology, 2020; 41: 81-91.
Idanpaan-Heikkila. "14C-lysergide in early pregnancy." The Lancet, Jul. 26, 1969; 294(7613): 221; 1 page.
Idanpaan-Heikkila. "Total body kinetics and placental transfer of labeled LSD in mice." Drug Dependence. Austin & London, 1970; pp. 55-66; 13 pages.
International Preliminary Report on Patentability for International Application No. PCT/US2022/040636, by Mind Medicine, Inc., mailed on Feb. 29, 2024, 8 pages.
International Preliminary Report on Patentability for International Application No. PCT/US2022/40653, by Mind Medicine, Inc., mailed on Feb. 29, 2024, 8 pages.
Invitation to Pay Additional fees for International Application No. PCT/US2022/040636, by Mind Medicine, Inc., mailed Oct. 18, 2022, 2 pages.
Irwin. "Chromosomal abnormalities in leukocytes from LSD-25 users." Science, 1967; 157(3786): 313-314.
Isbell. "Comparison of the reactions induced by psilocybin and LSD-25 in man." Psychopharmacologia, 1959; 1: 29-38.
Issakidis. "Pretreatment attrition and dropout in an outpatient clinic for anxiety disorders." Acta Psychiatrica Scandinavica. 2004; 109(6): 426-433.
Jagiello. "Mouse germ cells and LSD-25." Cytogenics, 1969; 8:136-147.
Johansen. "Psychedelics not linked to mental health problems or suicidal behavior: a population study." Journal of Psychopharmacology, 2015; 29(3): 270-279.
Johnson. "Pilot study of the 5-HT2AR agonist psilocybin in the treatment of tobacco addiction." Journal of Psychopharmacology, 2014; 28(11): 983-992.
Johnson. "Long-term follow-up of psilocybin-facilitated smoking cessation." American Journal of Drug and Alcohol Abuse, 2017; 43(1): 55-60.
Johnston. "Monitoring the future, national survey results on drug use, 1975-2015: vol. 2. College students and adults ages 19-55." Ann Arbor: Institute for Social Research, The University of Michigan, 2016 [online] http://monitoringthefuture.org/pubs.html#monographs (Access Date: Nov. 1, 2021); pages.
Judd. "A prospective 12-year study of subsyndromal and syndromal depressive symptoms in unipolar major depressive disorders." Archives Of General Psychiatry, Aug. 1998; 55: 694-700.
Kaelen. "LSD enhances the emotional response to music." Psychopharmacol (Berl), 2015; 232: 3607-3614.
Kaelen. "LSD modulates music-induced imagery via changes in parahippocampal connectivity." Eur Neuropsychopharmacol, 2016; 26: 1099-1109.
Kariuki-Nyuthe. "Anxiety and Related Disorders and Physical Illness." In: Sartorius N, Holt RIG, Maj M (eds): Comorbidity of Mental and Physical Disorders. Key Issues Ment Health. Basel, Karger, 2015; 179: 81-87.
Kato. "LSD-25 and genetic damage." Dis Nerv Sys, 1969; 30: 42-46.
Kavan. "Generalized anxiety disorder: Practical assessment and management." American Family Physician, May 1, 2009; 79(9): 785-791.
Kessler. "Lifetime prevalence and age-of-onset distributions of DSM-IV disorders in the National Comorbidity Survey Replication." Archives of General Psychiatry, Jun. 2005; 62(6): 593-602.
Kessler. "Prevalence, severity, and comorbidity of 12-month DSM-IV disorders in the National Comorbidity Survey Replication." Arch Gen Psychiatry, 2005; 62: 617-627.
Kessler. "The epidemiology of generalized anxiety disorder." Psychiatr Clin North Am, 2001; 24(1): 19-39.
Klette. Metabolism of Lysergic Acid Diethylamide (LSD) to 2-Oxo-3-Hydroxy Lsd (O-H-LSD) in Human Liver Microsomes and Cryopreserved Human Hepatocytes. J Anal Toxicol, 2000; 24(7): 550-556.
Klock. "Coma, hyperthermia and bleeding associated with massive LSD overdose. A report of eight cases." The Western Journal of Medicine, 1974; 120(3): 183-188.

(56) References Cited

OTHER PUBLICATIONS

Koch. "Swallowing Disorders," Diagnosis and therapy, Medical Clinics of North America, May 1993; 77(3): 571-582.
Koelle. "The pharmacology of mescaline and D-lysergic acid diethylamide (LSD)." New England Journal of Medicine, 1958; 258(1): 25-32.
Kraehenmann. "Dreamlike effects of LSD on waking imagery in humans depend on serotonin 2A receptor activation." Psychopharmacol (Berl), 2017; 234: 2031-2046.
Kraehenmann. "LSD Increases Primary Process Thinking via Serotonin 2A Receptor Activation." Front Pharmacol 2017; 8: 814; 9 pages.
Krall. Marked decrease of LSD-induced stimulus control in serotonin transporter knockout mice. Pharmacol Biochem Behav, 2008; 88: 349-357.
Krebs. "Over 30 million psychedelic users in the United States." F1000 Research, 2013; 2: 98; 5 pages.
Krebs. "Psychedelics and mental health: a population study." PLoS One, Aug. 2013; 8(8): e63972; 9 pages.
Krebs. "Lysergic acid diethylamide (LSD) for alcoholism: meta-analysis of randomized controlled trials." Journal of Psychopharmacology, 2012; 26(7): 994-1002.
Krebs-Thomson. "Effects of hallucinogens on locomotor investigatory activity and patterns: Influence of 5-$HT_{2A}$ and 5-$HT_{2c}$ receptors," Neuropsychopharmacology, 1998; 18(5): 339-351.
Kristensen. "LSD treatment combined with parenteral Ritalin therapy." Nord Psykiatr Tidsskr, 1962; 16: 111-116; 14 pages with English machine translation.
Krus. "Inhibitory effects of steroids on LSD-25 action in man." Life Sci, 1967; 6: 691-701.
Krus. "The influence of progesterone on behavioral changes induced by lysergic acid diethylamide (LSD-25) in normal males." Psychopharmacol, 1961; 2: 177-184.
Kupferschmidt. "High hopes." Science, Jul. 4, 2014; 345(6192): 18-23.
Kyzar. Effects of LSD on grooming behavior in serotonin transporter heterozygous (Sert+/−) mice. Behav Brain Res, 2016; 296: 47-52.
Lambe. "Hallucinogen-induced UP states in the brain slice of rat prefrontal cortex: role of glutamate spillover and NR2B-NMDA receptors." Neuropsychopharmacology, 2006; 31: 1682-1689.
Lanz. "Distribution of lysergic acid diethylamide in the organism." Helv Physiol Pharmacol Acta., 1955; 13(3): 207-216; 10 pages with English summary.
Lebedev. "LSD-induced entropic brain activity predicts subsequent personality change." Human Brain Mapping, 2016; 37: 3203-3213.
Lenze. "Efficacy and tolerability of citalopram in the treatment of late-life anxiety disorders: Results from an 8-week randomized, placebo-controlled trial." American Journal of Psychiatry, Jan. 2005; 162(1): 146-150.
Leonard. "Does getting high hurt? Characterization of cases of LSD and psilocybin-containing mushroom exposures to national poison centers between 2000 and 2016." J Psychopharmacol, Dec. 2018; 32(12): 1286-1294.
Levy. "Diazepam for L.S.D. intoxication." Lancet, 1971; 1: 1297; 1 page.
Liechti. "Modern clinical research on LSD." Neuropsychopharmacology, 2017; 42(11): 2114-2127.
Llorca. "Efficacy and safety of hydroxyzine in the treatment of generalized anxiety disorder: A 3-month double-blind study." Journal of Clinical Psychiatry, 2002; 63(11): 1020-1027.
Long. "Does LSD induce chromosomal damage and malformations? A review of the literature." Teratology, 1972; 6(1): 75-90.
Luethi. "Cytochrome P450 enzymes contribute to the metabolism of LSD to nor-LSD and 2-oxo-3-hydroxy-LSD: Implications for clinical LSD use." Biochemical Pharmacology, 2019; 164: 129-138.
Ly. "Psychedelics promote structural and functional neural plasticity." Cell Reports, 2018; 23(11): 3170-3182.
Maastricht University, "LSD microdosing" NTR-new: NL6907, NTR-old: NTR7102, (Jan. 5, 2018), 5 pages.
Mackenzie. "Chromosomal abnormalities in human leukocytes exposed to LSD in culture." Mamm Chromosome Newsl, 1968; 9: pp. 212-216.
Maier. "The Hamilton Anxiety Scale: Reliability, validity and sensitivity to change in anxiety and depressive disorders." Journal of Affective Disorders, 1988; 14: 61-68.
Malhi. "Depression." Lancet. Seminar, Nov. 24, 2018; 392(10161): 2299-2312.
Marek. "LSD and the phenethylamine hallucinogen DOI are potent partial agonists at 5-HT2A receptors on interneurons in rat piriform cortex." J Pharmacol Exp Ther, 1996; 278: 1373-1382.
Marona-Lewicka. "Dopamine D4 receptor involvement in the discriminative stimulus effects in rats of LSD, but not the phenethylamine hallucinogen DOI." Psychopharmacology, 2009; 203: 265-277.
Marona-Lewicka. "An animal model of schizophrenia based on chronic LSD administration: Old idea, new results." Neuropharmacology, 2011; 61: 503-512.
Marona-Lewicka. "Further evidence that the delayed temporal dopaminergic effects of LSD are mediated by a mechanism different than the first temporal phase of action." Pharmacology, Biochemistry and Behavior, 2007; 87(4): 453-461.
Marona-Lewicka. "Complex stimulus properties of LSD: a drug discrimination study with α2-adrenoceptor agonists and antagonists." Psychopharmacology, 1995; 120(4): 384-391.
Marona-Lewicka. "Distinct temporal phases in the behavioral pharmacology of LSD: dopamine D2 receptor-mediated effects in the rat and implications for psychosis." Psychopharmacology, 2005; 180(3): 427-435.
Martin. "The effects of hallucinogens on gene expression." Curr Topics Behav Neurosci, 2017; 36: 137-158.
Martin. "Chronic LSD alters gene expression profiles in the mPFC relevant to schizophrenia." Neuropharmacology, 2014; 83: 1-8.
McGahuey. "The Arizona Sexual Experience Scale (ASEX): reliability and validity." J Sex Marital Ther, 2000; 26(1): 25-40.
Meehan. "LSD produces conditioned place preference in male but not female Fawn Hooded rats." Pharmacol Biochem Behav, 1998; 59(1): 105-108.
Meert. "Risperidone (R 64 766), a potent and complete LSD antagonist in drug discrimination by rats." Psychopharmacology, 1989; 97(2): 206-212.
Milburn. "Characterization of [3H]Quipazine Binding to 5 Hydroxytryptamine3Receptors in Rat Brain Membranes." Journal of Neurochemistry, 1989; 52(6): 1787-1792.
Miller. "Primate trace amine receptor 1 modulation by the dopamine transporter." Journal of Pharmacology and Experimental Therapeutics, 2005; 313(3): 983-994.
Mind Medicine, Inc., "A Study to Assess 18-Methoxycoronaridine (18-MC HCl) in Healthy Volunteers" ClinicalTrials.gov ID NCT04292197, version 10, Jan. 4, 2022, 11 pages.
Mind Medicine, Inc., "A Study to Assess 18-Methoxycoronaridine (18-MC HCl) in Healthy Volunteers" ClinicalTrials.gov ID NCT04292197, version 9, Aug. 3, 2021, 15 pages.
Minuzzi. "Interaction between LSD and dopamine D2/3 binding sites in pig brain." Synapse, 2005; 56: 198-204.
Montgomery. "A new depression scale designed to be sensitive to change." The British Journal of Psychiatry, 1979; 134: 382-389.
Moreno. "Chronic treatment with LY341495 decreases 5-HT2A receptor binding and hallucinogenic effects of LSD in mice." Neuroscience Letters, 2013; 536: 69-73.
Mueller. "Altered network hub connectivity after acute LSD administration." NeuroImage: Clinical, 2018; 18: 694-701.
Mueller. "Acute effects of LSD on amygdala activity during processing of fearful stimuli in healthy subjects." Translational Psychiatry, 2017; 7: e1084; 5 pages.
Multidisciplinary Association for Psychedelic Studies "Lysergic Acid Diethylamide (LSD)-Assisted Psychotherapy in People With Illness-related Anxiety" ClinicalTrials.gov ID NCT00920387, version 13, Jun. 14, 2022, 27 pages.
Multidisciplinary Association for Psychedelic Studies "Lysergic Acid Diethylamide (LSD)-Assisted Psychotherapy in People With Illness-related Anxiety" ClinicalTrials.gov ID NCT00920387, version 9, Apr. 16, 2014, 14 pages.

(56) References Cited

OTHER PUBLICATIONS

Muneer. "Effects of LSD on human chromosomes." Mutat Res, 1978; 51(3): 403-410.
Murakamii. "Behavioral thermoregulation in rats during hyperthermia induced by lysergic acid diethylamide." Neuroscience Letters, 1980; 20(1): 105-108.
National Institute of Mental Health. "What is Depression" OMB Approval #0925-0648 Expiration Date Jun. 30, 2024 [online] https://www.nimh.nih.gov/health/topics/depression (Access Date: May 2024); 3 pages.
National Toxicology Program. "Toxicology and carcinogenesis studies of diethylamine (CAS No. 109-89-7) in F344/N rats and B6C3F1 mice (inhalation studies)." Natl Toxicol Program Tech Rep Ser, Oct. 2011; (566): 1-174.
Nichols. "Molecular genetic responses to lysergic acid diethylamide include transcriptional activation of MAP kinase phosphatase-1, C/EBP-b and ILAD-1, a novel gene with homology to arrestins." J Neurochem, 2004; 90: 576-584.
Nichols. "Dynamic changes in prefrontal cortex gene expression following lysergic acid diethylamide administration." Molecular Brain Research, 2003; 111: 182-188.
Nichols. "Hallucinogens." Pharmacology & Therapeutics, 2004; 101(2): 131-181.
Nichols. "Is LSD toxic?" Forensic Science International, 2018; 284: 141-145.
Nichols. "Lysergamides of isomeric 2,4-dimethylazetidines map the binding orientation of the diethylamide moiety in the potent hallucinogenic agent N, N- diethyllysergamide (LSD)." J Med Chem, 2002; 45: 4344-4349.
Niwaguchi. "Studies on enzymatic dealkylation of D-lysergic acid diethylamide (LSD)." Biochem Pharmacol, 1974; 23: 1073-1078.
Niwaguchi. "Studies on the in vitro metabolism of compounds related to lysergic acid diethylamide (LSD)." Biochem Pharmacol, 1974; 23: 3066-3067.
Norman. "[$^3$H] WB4101 labels the 5-HT$_{1A}$ serotonin receptor subtype in rat brain. Guanine nucleotide and divalent cation sensitivity." Mol Pharmacol, 1985; 28: 487-494.
Olbrich. "LSD and ketanserin and their impact on the human autonomic nervous system." Psychophysiol, 2021; 58(6): e13822; 11 pages.
Pahnke. "Psychedelic therapy (utilizing LSD) with cancer patients." J Psychedelic Drugs, 1970; 3(1): 63-75.
Pahnke. "LSD-assisted psychotherapy with terminal cancer patients." Curr Psychiatr Ther, 1969; 9: 144-152.
Pande, "An overview on emerging trends in immediate release tablet technologies", Austin Therapeutics (2016); 3(1): 1026; 9 pages.
Papac. "Measurement of lysergic acid diethylamide (LSD) in human plasma by gas chromatography/negative ion chemical ionization mass spectrometry." J Anal Toxicol, 1990; 14: 189-190.
Parker. "LSD produces place preference and flavor avoidance but does not produce flavor aversion in rats." Behav Neurosci, 1996; 110(3) :503-508.
Peroutka. "The clinical utility of pharmacological agents that act at serotonin receptors." J Neuropsychiatry Clin Neurosci, 1989; 1: 253-262.
Pierce. "Hallucinogenic drug interactions with neurotransmitter receptor binding sites in human cortex." Psychopharmacology, 1989; 97(1): 118-122.
Pinheiro. "Model-based dose finding under model uncertainty using general parametric models." Statistics in Medicine, 2014; 33(10): 1646-1661.
Páleníček. "Sex differences in the effects of N,N-diethyllysergamide (LSD) on behavioral activity and prepulse inhibition." Progress Neuro-Psychopharmacol Biol Psych, 2010; 34: 588-596.
Poch. "Detection of metabolites of lysergic acid diethylamide (LSD) in human urine specimens: 2-oxo-3-hydroxy-LSD, a prevalent metabolite of LSD." Journal of Chromatography. B Biomed Sci Appl, 1999; 724(1): 23-33.
Pokorny. "LSD acutely impairs working memory, executive functions, and cognitive flexibility, but not risk-based decision-making." Psychol Med, 2020; 50: 2255-2264.
Posner. "The Columbia-Suicide Severity Rating Scale: initial validity and internal consistency findings from three multisite studies with adolescents and adults." American Journal of Psychiatry, Dec. 2011; 168(12): 1266-1277.
Preller, K.H., et al., "Changes in global and thalamic brain connectivity in LSD-induced altered states of consciousness are attributable to the 5-HT2A receptor," Elife, Oct. 2018, vol. 7:e35082, pp. 1-31.
Preller. "The fabric of meaning and subjective effects in LSD-induced states depend on serotonin 2A receptor activation." Current Biology, 2017; 27(3): 451-457.
Psychiatric University Hospital, Zurich, "The Role of 5-HT2A Receptor in the Perception of Self and Personal Meaning in Healthy Volunteers" ClinicalTrials.gov ID NCT02451072, version 3, Jan. 29, 2016, 10 pages.
Ramaekers. "A low dose of lysergic acid diethylamide decreases pain perception in healthy volunteers." J Psychopharmacol, 2021; 35: 398-405.
RASMUSSEN. "Effect of hallucinogens on spontaneous and sensory-evoked locus coeruleus unit activity in the rat: reversal by selective 5-HT$_2$ antagonists." Brain Research, 1986; 385(2): 395-400.
Reissig. "The 5-HT1A receptor and the stimulus effects of LSD in the rat." Psychopharmacology, 2005; 182: 197-204.
Reitz. "Epidemiology of Alzheimer disease", Nature Reviews Neurology, Mar. 2011; 7(3): 137-152. doi: 10.1038/nrneurol.2011.2. Epub Feb. 8, 2011.
Rickels. "Pregabalin for treatment of generalized anxiety disorder: A 4-week, multicenter, double-blind, placebo-controlled trial of pregabalin and alprazolam." Arch. Gen. Psychiatry, Sep. 2005; 62: 1022-1030. doi.org/10.1001/archpsyc.62.9.1022.
Rickels. "Paroxetine treatment of generalized anxiety disorder: a double-blind, placebo-controlled study." American Journal of Psychiatry, 2003; 160(4): 749-756.
Rickli. "Receptor interaction profiles of novel N-2-methoxybenzyl (NBOMe) derivatives of 2,5-dimethoxy-substituted phenethylamines (2C drugs)." Neuropharmacology, 2015; 99: 546-553.
Rickli. "Receptor interaction profiles of novel psychoactive tryptamines compared with classic hallucinogens." Eur Neuropsychopharmacol, 2016; 26: 1327-1337.
Ringeisen. "Mental and Substance Use Disorders Prevalence Study (MDPS): Findings Report." RTI International, 2023 [online] https://www.rti.org/publication/mental-and-substance-use-disorders-prevalence-study/fulltext.pdf (Access Date: Apr. 4, 2024); 77 pages.
Rodriguiz. "LSD-stimulated behaviors in mice require β-arrestin 2 but not β-arrestin 1." Scientific Reports, 2021; 11(1): 17690; 14 pages.
Romano. "Intrahippocampal LSD accelerates learning and desensitizes the 5-HT2A receptor in the rabbit." Psychopharmacology, 2010; 212: 441-448.
Ross. "Rapid and sustained symptom reduction following psilocybin treatment for anxiety and depression in patients with life-threatening cancer: a randomized controlled trial." Journal of Psychopharmacology, 2016; 30(12): 1165-1180. doi.org/10.1177/0269881116675512.
Rothlin. "Pharmacology of LSD-25." Lysergic acid diethylamide and mescaline in experimental psychiatry. New York: Grune and Stratton, 1956, pp. 1-7.
Rothlin. "Metabolism of lysergic acid diethylamide." Nature, Dec. 2, 1956; 178(4547): 1400-1401.
Roux. "LSD: No. teratogenic action in rats, mice and hamsters." Science, 1970: 169: 588-589.
Ruscio. "Cross-sectional comparison of the epidemiology of DSM-5 generalized anxiety disorder across the globe." JAMA Psychiatry, 2017; 74(5): 465-475.
Rynn. "Efficacy and safety of duloxetine in the treatment of generalized anxiety disorder: A flexible-dose, progressive-titration, placebo-controlled trial." Depression and Anxiety, 2008; 25(3): 182-189.
Sanders-Bush. "Lysergic acid diethylamide and 2,5-dimethoxy-4-methylamphetamine are partial agonists at serotonin receptors linked

(56) References Cited

OTHER PUBLICATIONS to phosphoinositide hydrolysis." Journal of Pharmacology and Experimental Therapeutics, 1988; 246(3): 924-928.
Sato. "LSD in pregnancy: chromosomal effects." Life Sciences, 1971; 10(13): 773-779.
Savage. "Residential psychedelic (LSD) therapy for the narcotic addict. A controlled study." Archives General Psychiatry, 1973; 28(6): 808-814.
Schindler. " Indoleamine Hallucinogens in Cluster Headache: Results of the Clusterbusters Medication Use Survey." Journal of Psychoactive Drugs, 2015; 47(5): 372-381.
Schlag. "Adverse effects of psychedelics: From anecdotes and misinformation to systematic science." Journal of Psychopharmacology, Mar. 2022; 36(3): 258-272.
Schmid. "Long-lasting subjective effects of LSD in normal subjects." Psychopharmacology (Berl), 2018; 235(2): 535-545.
Schmid. "Acute Effects of Lysergic Acid Diethylamide in Healthy Subjects." Biological Psychiatry, 2015; 78(8): 544-553.
Seeman. "Dopamine D2high receptors stimulated by phencyclidines, lysergic acid diethylamide, salvinorin A, and modafinil." Synapse, 2009; 63: 698-704.
Seeman P, Ko F, Tallerico T. Dopamine receptor contribution to the action of PCP, LSD and ketamine psychotomimetics. Mol Psychiatry. 2005;10(9):877-883.
Sessa. "The pharmacology of LSD: A critical review." British J Psych, 2011; 199(3); 258-259.
Sewell. "Response of cluster headache to psilocybin and LSD." Neurology, 2006; 66(12): 1920-1922.
Shear. "Reliability and validity of a structured interview guide for the Hamilton Anxiety Rating Scale (SIGH-A)." Depress Anxiety, 2001; 13(4): 166-78.
Sheehan. "The Mini-International Neuropsychiatric Interview (M.I.N.I.): the development and validation of a structured diagnostic psychiatric interview for DSM-IV and ICD-10." J Clin Psychiatry, 1998; 59(Suppl 20): 22-33.
Sheehan. "Assessing treatment effects in clinical trials with the Discan metric of the Sheehan Disability Scale." International Clinical Psychopharmacology, 2008; 23(2): 70-83.
Siddik. "The fate of lysergic acid di[14C]ethylamide ([14C]LSD) in the rat." Biochem Soc Trans. 1975; 3(2): 290-292.
Siddik. "The fate of lysergic acid di[14C]ethylamide ([14C]LSD) in the rat, guinea pig and rhesus monkey and of [14C]iso-LSD in rat." Biochemical Pharmacology, 1979; 28(20): 3093-3101.
Siddik. "The metabolism of lysergic acid DI[14C]-ethylamide ([14C]LSD) in the isolated perfused rat liver." Biochemical Pharmacology, 1979; 28(20): 3081-3091.
Singh. "Chromosomal aberrations induced in barley by LSD." Science, Jul. 31, 1970; 169: 491-492.
Skakkebaek. "Studies on meiotic chromosomes and spermatozoan heads in mice treated with LSD." J Reprod Fertil, 1970; 22: 141-144.
Snyder. "Regional Localization of lysergic acid diethylamide in monkey brain." Nature, 1966; 209(5028): 1093-1095.
Stein. "Etifoxine versus alprazolam for the treatment of adjustment disorder with anxiety: a randomized controlled trial." Adv Ther, 2015; 32(1): 57-68.
Stein. "Pharmacotherapy of adjustment disorder: A review." World Journal of Biological Psychiatry, 2018; 19(sup1): S46-S52.
Steuer. "Development and validation of an ultra-fast and sensitive microflow liquid chromatography-tandem mass spectrometry (MFLC-MS/MS) method for quantification of LSD and its metabolites in plasma and application to a controlled LSD administration study in humans." Drug Test Analysis, 2017; 9(5): 788-797.
Stocco. "The Molecular Control of Corpus Luteum Formation, Function, and Regression." Endocrine Reviews, Feb. 2007, 28(1): 117-149.
Stoll. "Distribution and fate of 14C-labeled lysergic acid diethylamide (LSD 25) in the animal body." Experientia, 1955; 11(10): 396-397.
Stoll. "Über die Stereochemie der Lysergsäuren und der Dihydrolysergsäuren. 37. Mitteilung über Mutterkornalkaloide." Helv Chim Acta, 1954; 37(7): 2039-2057; 19 pages with English summary.
Stoll. "Über die Synthese von 14C-Diathylamin und 14C-Lysergsaure-diathylamid." Helv Chim Acta, 1954; 37: 820-824; 10 pages with English Machine Translation.
Strajhar. "Acute effects of lysergic acid diethylamide on circulating steroid levels in healthy subjects." J Neuroendocrino, 2016; 28: 12374; 13 pages.
Studerus. "Psychometric evaluation of the altered states of consciousness rating scale (OAV)." PLoS One, 2010; 5(8): e12412; 19 pages.
Sturelid. "Lysergic acid diethylamide and chromosome breakage." Hereditas, 1969; 62: 259-262.
Tagliazucchi. "Increased global functional connectivity correlates with LSD-induced ego dissolution." Curr Biol 2016; 26: 1043-1050.
Terhune. "A placebo-controlled investigation of synaesthesia-like experiences under LSD." Neuropsychologia 2016; 88: 28-34.
Titeler. "Radioligand binding evidence implicates the brain 5 HT2 receptor as a site of action for LSD and phenylisopropylamine hallucinogens." Psychopharmacol, 1988; 94: 213-216.
Trulson. "Dissociations between the effects of hallucinogenic drugs on behavior and raphe unit activity in freely moving cats." Brain Research, 1981; 215: 275-293.
University Hospital, Basel, Switzerland, "Acute Dose-dependent Effects of DMT in Healthy Subjects (DMT DR)" ClinicalTrials.gov ID NCT05384678, version 1, May 17, 2022, 13 pages.
University Hospital, Basel, Switzerland, "Comparative Acute Effects of LSD, Psilocybin and Mescaline (LPM)" ClinicalTrials.gov ID NCT04227756, version 4, Aug. 17, 2021, 13 pages.
University Hospital, Basel, Switzerland, "Comparative Acute Effects of LSD, Psilocybin and Mescaline (LPM)" ClinicalTrials.gov ID NCT04227756, version 6, Mar. 30, 2022, 12 pages.
University Hospital, Basel, Switzerland, "Effect of Ketanserin After LSD Administration (L-Ket)" ClinicalTrials.gov ID NCT04558294, version 2, Oct. 26, 2020, 13 pages.
University Hospital, Basel, Switzerland, "Effect of Ketanserin After LSD Administration (L-Ket)" ClinicalTrials.gov ID NCT04558294, version 3, Oct. 20, 2021, 13 pages.
University Hospital, Basel, Switzerland, "Effects of MDMA Co-administration on the Response to LSD in Healthy Subjects (LSD-MDMA)" ClinicalTrials.gov ID NCT04516902, version 2, Jan. 25, 2021, 13 pages.
University Hospital, Basel, Switzerland, "Effects of MDMA Co-administration on the Response to LSD in Healthy Subjects (LSD-MDMA)" ClinicalTrials.gov ID NCT04516902, version 3, Sep. 6, 2021, 13 pages.
University Hospital, Basel, Switzerland, "Effects of SERT Inhibition on the Subjective Response to LSD in Healthy Subjects (SERT-LSD)" ClinicalTrials.gov ID NCT05175430, version 1, Dec. 14, 2021, 13 pages.
University Hospital, Basel, Switzerland, "LSD Base and LSD Tartrate Bioequivalence and Bioavailability in Healthy Subjects (LSD-Bio)" ClinicalTrials.gov ID NCT04865653, version 1, Apr. 26, 2021, 14 pages.
University Hospital, Basel, Switzerland, "LSD Base and LSD Tartrate Bioequivalence and Bioavailability in Healthy Subjects (LSD-Bio)" ClinicalTrials.gov ID NCT04865653, version 3, Mar. 30, 2022, 14 pages.
University Hospital, Basel, Switzerland, "LSD Therapy for Persons Suffering From Major Depression (LAD)" ClinicalTrials.gov ID NCT03866252, version 10, May 24, 2022, 14 pages.
University Hospital, Basel, Switzerland, "LSD Therapy for Persons Suffering From Major Depression (LAD)" ClinicalTrials.gov ID NCT03866252, version 8, Feb. 8, 2021, 14 pages.
University Hospital, Basel, Switzerland, "LSD Treatment in Persons Suffering From Anxiety Symptoms in Severe Somatic Diseases or in Psychiatric Anxiety Disorders (LSD-assist)" ClinicalTrials.gov ID NCT03153579, version 7, Dec. 21, 2021, 12 pages.
University Hospital, Basel, Switzerland, "LSD Treatment in Persons Suffering From Anxiety Symptoms in Severe Somatic Diseases or in Psychiatric Anxiety Disorders (LSD-assist)" ClinicalTrials.gov ID NCT03153579, version 9, Mar. 12, 2020, 12 pages.

(56) References Cited

OTHER PUBLICATIONS

University Hospital, Basel, Switzerland, "Lysergic Acid Diethylamide (LSD) as Treatment for Cluster Headache (LCH)" ClinicalTrials.gov ID NCT03781128, version 4, Apr. 19, 2021, 14 pages.
University Hospital, Basel, Switzerland, "Lysergic Acid Diethylamide (LSD) as Treatment for Cluster Headache (LCH)" ClinicalTrials.gov ID NCT03781128, version 5, May 4, 2022, 14 pages.
University Hospital, Basel, Switzerland, "Neuronal Correlates of Altered States of Consciousness (5HT2A-fMRI)" ClinicalTrials.gov ID NCT02308969, version 4, Sep. 24, 2015, 9 pages.
University Hospital, Basel, Switzerland, "Role of Dopamine, Serotonin and 5-HT2A Receptors in Emotion Processing (LAM)" ClinicalTrials.gov ID NCT03019822, version 6, Oct. 12, 2018, 12 pages.
University Hospital, Basel, Switzerland, "Role of the Serotonin 5-HT2A Receptor in Mescaline-induced Altered States of Consciousness (MDR)" ClinicalTrials.gov ID NCT04849013, version 3, Aug. 17, 2021, 15 pages.
University of Chicago, "Mood Effects of Serotonin Agonists" ClinicalTrials.gov ID NCT03790358, version 1, Dec. 28, 2018, 9 pages.
U'Prichard. "Binding characteristics of a radiolabeled agonist and antagonist at central nervous system alpha noradrenergic receptors." Molecular Pharmacology, 1977; 13(3): 454-473.
U.S. Department of Health and Human Services, Food and Drug Administration, Center for Drug Evaluation and Research (CDER), Pharmacology and Toxicology, "Guidance for Industry Estimating the Maximum Safe Starting Dose in Initial Clinical Trials for Therapeutics in Adult Healthy Volunteers," Jul. 2005, 30 pages.
Van Went. "Mutagenicity testing of 3 hallucinogens: LSD, psilocybin and ‡ 9-THC using the micronucleus test." Experientia, 1978; 34(3): 324-325.
Verstraete. "2-oxo-3-hydroxy-LSD: An important LSD metabolite?" Acta Clinica Belgica, 1999; 53(Suppl1): 94-96.
Vizeli. "Genetic influence of CYP2D6 on pharmacokinetics and acute subjective effects of LSD in a pooled analysis." Sci Rep, 2021; 11(1): 10851; 9 pages.
Wacker. "Crystal structure of an LSD-bound human serotonin receptor." Cell, 2017; 168: 377-389.
Waghorn. "Disability, employment and work performance among people with ICD-10 anxiety disorders." Australian & New Zealand Journal of Psychiatry, 2005; 39(1-2): 55-66.
Wan. "Estimation of symptom-free days in generalized anxiety disorder." Current Medical Research and Opinion, 2006; 22(3): 587-591.
Warkany. "Lysergic acid diethylamide (LSD): No teratogenicity in rats." Science, 1968; 159: 731-732.
Watts. "LSD and structural analogs: pharmacological evaluation at D1 dopamine receptors." Psychopharmacology (Berl), 1995; 118: 401-409.
Wing. "5HT-2 mediation of acute behavioral effects of hallucinogens in rats." Psychopharmacology, 1990; 100: 417-425.
Winter. "Tolerance to a behavioral effect of lysergic acid diethylamide and cross-tolerance to mescaline in the rat: Absence of a metabolic component." J Pharmacol Exp Ther, 1971; 178: 625-630.
World Health Organization. "Anxiety Disorders." Sep. 27, 2023 [online] https://www.who.int/news-room/fact-sheets/detail/anxiety-disorders (Access Date: Jun. 20, 2024); 5 pages.
Yanakieva. "The effects of microdose LSD on time perception: a randomised, double-blind, placebo-controlled trial." Psychopharmacol, 2018; 236: 1159-1170.
Zeiger. "Salmonella Mutagenicity tests: III. Results from the testing of 255 chemicals." Molec Mutagen, 1987; 9(S9): 1-109.
Abramson. "Lysergic acid diethylamide (LSD-25): XXIX. The response index as a measure of threshold activity of psychotropic drugs in man", The Journal of Psychology (1959); 48(1): 65-78.
Advisory Action for U.S. Appl. No. 17/156,233, by Liechti, Matthias Emanuel et al., mailed on Dec. 14, 2023, 3 pages.
Advisory Action for U.S. Appl. No. 17/156,233, by Liechti, Matthias Emanuel et al., mailed on Mar. 20, 2023, 5 pages.

Advisory Action for U.S. Appl. No. 17/225,715, by Liechti, Matthias Emanuel et al., mailed on Mar. 14, 2023, 3 pages.
Advisory Action for U.S. Appl. No. 17/672,670, by Liechti, Matthias Emanuel et al., mailed on Feb. 23, 2024, 4 pages.
Advisory Action for U.S. Appl. No. 17/672,670, by Liechti, Matthias Emanuel et al., mailed on Jul. 13, 2023, 3 pages.
Advisory Action for U.S. Appl. No. 17/869,896, by Liechti, Matthias Emanuel et al., mailed on Sep. 5, 2024, 5 pages.
Advisory Action for U.S. Appl. No. 18/077,096, by Mack, Peter et al., mailed on Aug. 30, 2024, 5 pages.
Advisory Action for U.S. Appl. No. 18/194,761, by Mack, Peter et al., mailed on Apr. 4, 2024, 4 pages.
Advisory Action for U.S. Appl. No. 18/321,159, by Liechti, Matthias Emanuel et al., mailed on May 21, 2024, 5 pages.
Akimoto et al., "Changes in brain metabolites related to stress resilience: Metabolomic analysis of the hippocampus in a rat model of depression", Behavioural Brain Research (2019); 359: 342-352. doi: 10.1016/j.bbr.2018.11.017. Epub Nov. 14, 2018.
Anderson et al., "Psychedelic microdosing benefits and challenges: an empirical codebook", Harm Reduction Journal (2019); 16(43): 1-10.
Andersson et al., "Twenty percent better with 20 micrograms? A qualitative study of psychedelic microdosing self-rapports and discussions on YouTube", Harm Reduction Journal (2019); 16(1): 1-12. doi: 10.1186/s12954-019-0333-3.
[Author Unknown, Date Unknown] "3.3: Crystalline and Amorphous Solids", LibreTexts Chemistry [online] https://chem.libretexts.org/Under_Construction/Purgatory/AUCHE_110%3A_General_Chemistry_I_(Rempel)/03%3A_States_of_Matter/3.03%3A_Crystalline_and_Amorphous_Solids (Access Date: Mar. 14, 2025); 2 pages.
Bailey et al., "Distinction of Some Dialkyl Amides of Lysergic and iso-Lysergic Acids from LSD", Journal of the Association of Official Analytical Chemists (1973); 56(1): 88-99.
Baker et al., "Molecular structure of LSD", Science (1972); 178(4061): 614-615. doi: 10.1126/science.178.4061.614.
Barrett et al., "Serotonin 2A receptor signaling underlies LSD-induced alteration of the neural response to dynamic changes in music", Cerebral Cortex (2018); 28(11): 3939-3950. doi: 10.1093/cercor/bhx257.
Basu et al., "Association of serotonin transporter (SLC6A4) & receptor (5HTR1A, 5HTR2A) polymorphisms with response to treatment with escitalopram in patients with major depressive disorder: A preliminary study", Indian Journal of Medical Research (2015); 142(1): 40-45. doi: 10.4103/0971-5916.162094.
Beck. "An inventory for measuring depression", Archives of General Psychiatry (1961); 4(6): 561-571. doi: 10.1001/archpsyc.1961.01710120031004.
Becker et al., "Acute effects of psilocybin after escitalopram or placebo pretreatment in a randomized, double-blind, placebo-controlled, crossover study in healthy subjects", Clinical Pharmacology & Therapeutics (2022); 111(4): 886-895. doi: 10.1002/cpt.2487. Epub Nov. 22, 2021.
Berge et al., "Pharmaceutical salts", Journal of Pharmaceutical Sciences (Jan. 1977); 66(1): 1-19.
Bogenschutz. "Studying the effects of classic hallucinogens in the treatment of alcoholism: rationale, methodology, and current research with psilocybin", Current Drug Abuse Reviews (2013); 6(1): 17-29. doi: 10.2174/15733998113099990002.
Brandt et al., "Return of the lysergamides. Part II: analytical and behavioural characterization of N6-allyl-6-norlysergic acid diethylamide (AL-LAD) and (2'S, 4'S)-lysergic acid 2, 4-dimethylazetidide (LSZ)", Drug Testing and Analysis (2017); 9(1): 38-50. doi: 10.1002/dta.1985. Epub Jun. 6, 2016.
Brandt et al., "Return of the lysergamides. Part VI: Analytical and behavioural characterization of 1-cyclopropanoyl-d-lysergic acid diethylamide (1CP-LSD)", Drug Testing and Analysis (2020); 12(6): 812-826. doi: 10.1002/dta.2789. Epub Apr. 20, 2020.
Breitbart et al., "Meaning-centered group psychotherapy for patients with advanced cancer: A treatment manual", Introduction, OUP Us (2014); 9 pages.

(56) References Cited

OTHER PUBLICATIONS

Brown et al., "Pharmacokinetics of escalating doses of oral psilocybin in healthy adults", Clinical Pharmacokinetics (2017); 56: 1543-1554. doi: 10.1007/s40262-017-0540-6.
Cao et al., "Structure-based discovery of nonhallucinogenic psychedelic analogs", Science (2022); 375(6579): 403-411. doi: 10.1126/science.abl8615. Epub Jan. 27, 2022.
Carhart-Harris et al., "Neural correlates of the LSD experience revealed by multimodal neuroimaging", Proceedings of the National Academy of Sciences (2016); 113(17): 4853-4858. doi: 10.1073/pnas.1518377113. Epub Apr. 11, 2016.
Carhart-Harris et al., "Psilocybin with psychological support for treatment-resistant depression: six-month follow-up", Psychopharmacology (2018); 235: 399-408. doi: 10.1007/s00213-017-4771-x. Epub Nov. 8, 2017.
Carhart-Harris et al., "Trial of psilocybin versus escitalopram for depression", New England Journal of Medicine (2021); 384(15): 1402-1411. doi: 10.1056/NEJMoa2032994.
Caudle et al., "Standardizing Cyp 2D6 genotype to phenotype translation: consensus recommendations from the Clinical Pharmacogenetics Implementation Consortium and Dutch Pharmacogenetics Working Group", Clinical and translational Science (2020); 13(1): 116-124. doi: 10.1111/cts.12692. Epub Oct. 24, 2019.
Cohen. "Lysergic acid diethylamide: side effects and complications", The Journal of Nervous and Mental Disease (1960); 130(1): 30-40. doi: 10.1097/00005053-196001000-00005.
Co-pending U.S. Appl. No. 18/750,991, filed Jun. 21, 2024.
Crews et al., "Clinical Pharmacogenetics Implementation Consortium (CPIC) guidelines for codeine therapy in the context of cytochrome P450 2D6 (CYP2D6) genotype", Clinical Pharmacology & Therapeutics (2012); 91(2): 321-326. doi: 10.1038/clpt.2011.287. Epub Dec. 28, 2011.
Database STN, CAS Registry No. 2757566-19-9, "Ergoline-8-carboxamide, 9,10-didehydro-N-ethyl-N-(2-fluoroethyl)-6- methyl-, (8β)-" [Ca Index Name]. Chemical Abstracts Service, American Chemical Society; entered Jan. 28, 2022; 1 printed page.
Database STN, CAS Registry No. 2855122-73-3, "Ergoline-8-carboxamide, 9,10-didehydro-N,N-bis(2-fluoroethyl)-6-methyl-, (8β)-" [CA Index Name]. Chemical Abstracts Service, American Chemical Society; entered Nov. 17, 2022; 1 printed page.
Database STN, CAS Registry No. 2855123-59-8, "Ergoline-8-carboxamide, 9,10-didehydro-N, N-bis(2-fluoroethyl)-6-methyl-,(8β)-" [CA Index Name]. Chemical Abstracts Service, American Chemical Society; entered Nov. 17, 2022; 1 printed page.
Database STN, CAS Registry No. 3024529-93-6, "Ergoline-8-carboxamide, 9,10-didehydro-N-ethyl-N-2-propyn-1-yl-6-methyl-,(8β)-" [CA Index Name]. Chemical Abstracts Service, American Chemical Society; entered Jan. 11, 2024; 1 printed page.
Database STN, CAS Registry No. 3024530-02-4, "Ergoline-8-carboxamide, 9,10-didehydro-N-ethyl-N-methoxy-6-methyl-,(8β)-" [CA Index Name]. Chemical Abstracts Service, American Chemical Society; entered Jan. 11, 2024; 1 printed page.
Database STN, CAS Registry No. 3024530-08-0, "Ergoline-8-carboxamide, 9,10-didehydro-N-(2-fluoroethyl)-N-methoxy-6-methyl-, (8β)-" [CA Index Name]. Chemical Abstracts Service, American Chemical Society; entered Jan. 11, 2024; 1 printed page.
Database STN, CAS Registry No. 3024530-10-4, "Ergoline-8-carboxamide, 9,10-didehydro-N,N-diethyl-6-(2-fluoro-2-propen-1-yl)-, (8β)-" [CA Index Name]. Chemical Abstracts Service, American Chemical Society; entered Jan. 11, 2024; 1 printed page.
Database STN, CAS Registry No. 3024530-16-0, "Ergoline-8-carboxamide, 9,10-didehydro-N, N-diethyl-6-(2-oxopropyl)-, (8β)-" [CA Index Name]. Chemical Abstracts Service, American Chemical Society; entered Jan. 11, 2024; 1 printed page.
Database STN, CAS Registry No. 3024530-28-4, "Ergoline-8-carboxamide, 9,10-didehydro-N, N-diethyl-6-(2-fluoroethyl)-, (8β)-" [CA Index Name]. Chemical Abstracts Service, American Chemical Society; entered Jan. 11, 2024; 1 printed page.
Database STN, CAS Registry No. 3024530-30-8, "Ergoline-8-carboxamide, 9,10-didehydro-N-ethyl-6-(2-fluoro-2-propen-1-yl)-N-2-propyn-1-yl-, (8β)-" [CA Index Name]. Chemical Abstracts Service, American Chemical Society; entered Jan. 11, 2024; 1 printed page.
Database STN, CAS Registry No. 65527-59-5, "Ergoline-8-carboxamide, 9,10-didehydro-N-ethenyl-N-ethyl-6-methyl-, (8β)-(9CI)" [CA Index Name]. Chemical Abstracts Service, American Chemical Society; entered Nov. 16, 1984; 1 printed page.
Davis et al., "Effects of psilocybin-assisted therapy on major depressive disorder: a randomized clinical trial", JAMA Psychiatry (2021); 78(5): 481-489. doi: 10.1001/jamapsychiatry.2020.3285. Erratum in: JAMA Psychiatry. Feb. 10, 2021:569. doi: 10.1001/jamapsychiatry.2020.4714.
De Almeida et al., "Modulation of serum brain-derived neurotrophic factor by a single dose of ayahuasca: observation from a randomized controlled trial", Frontiers in Psychology (2019); 10: 1234; 13 pages. doi: 10.3389/fpsyg.2019.01234.
De Candia et al., "Effects of treatment with etizolam 0.5 mg BID on cognitive performance: a 3-week, multicenter, randomized, double-blind, placebo-controlled, two-treatment, three-period, noninferiority crossover study in patients with anxiety disorder", Clinical Therapeutics (2009); 31(12): 2851-2859. doi: 10.1016/j.clinthera.2009.12.010.
Denson et al., "A controlled study of LSD treatment in alcoholism and neurosis", The British Journal of Psychiatry (1970); 116(533): 443-445. doi: 10.1192/bjp.116.533.443.
Derogatis et al., "The SCL-90 and the MMPI: A step in the validation of a new self-report scale", The British Journal of Psychiatry (1976); 128(3): 280-289. doi: 10.1192/bjp.128.3.280.
Dolder et al., "Alcohol acutely enhances decoding of positive emotions and emotional concern for positive stimuli and facilitates the viewing of sexual images", Psychopharmacology (2017); 234: 41-51. doi: 10.1007/s00213-016-4431-6. Epub Sep. 19, 2016.
Domínguez-Clave et al., "Ayahuasca: Pharmacology, neuroscience and therapeutic potential", Brain Research Bulletin (2016); 126: 89-101. doi: 10.1016/j.brainresbull.2016.03.002. Epub Mar. 11, 2016.
Dos Santos et al., "Antidepressive, anxiolytic, and antiaddictive effects of ayahuasca, psilocybin and lysergic acid diethylamide (LSD): a systematic review of clinical trials published in the last 25 years", Therapeutic Advances in Psychopharmacology (2016); 6(3): 193-213. doi: 10.1177/2045125316638008. Epub Mar. 18, 2016.
Eisner et al., "Psychotherapy with lysergic acid diethylamide", The Journal of Nervous and Mental Disease (1958); 127(6): 528-539. doi: 10.1097/00005053-195812000-00006.
Erowid. "1P-LSD Reports (also 1-propionyl-lysergic acid diethylamide) (125 Total)", The Erowid Experience Vaults [online] https://erowid.org/experiences/subs/exp_1PLSD.shtml (Access Date: Mar. 14, 2025); 4 pages.
Eshleman et al., "Neurochemical pharmacology of psychoactive substituted N-benzylphenethylamines: High potency agonists at 5-HT2A receptors", Biochemical Pharmacology (2018); 158: 27-34. doi: 10.1016/j.bcp.2018.09.024. Epub Sep. 25, 2018.
Examiner Interview Summary for U.S. Appl. No. 17/156,233, by Liechti, Matthias Emanuel et al., mailed on Aug. 28, 2023, 3 pages.
Examiner Interview Summary for U.S. Appl. No. 17/156,233, by Liechti, Matthias Emanuel et al., mailed on Oct. 13, 2022, 3 pages.
Examiner Interview Summary for U.S. Appl. No. 18/194,761, by Mack, Peter et al., mailed on Apr. 4, 2024, 2 pages.
Examiner Interview Summary for U.S. Appl. No. 18/194,761, by Mack, Peter et al., mailed on May 14, 2024, 1 page.
Extended European Search Report for European Application No. 21760160.8, by Universitätsspital Basel, mailed Nov. 30, 2023, 7 pages.
Extended European Search Report for European U.S. Appl. No. 21789412, by Universitätsspital Basel, mailed Mar. 6, 2024, 13 pages.
Final Office Action for U.S. Appl. No. 17/156,233, by Liechti, Matthias Emanuel et al., mailed on Jan. 20, 2023, 16 pages.
Final Office Action for U.S. Appl. No. 17/156,233, by Liechti, Matthias Emanuel et al., mailed on Nov. 27, 2023, 21 pages.
Final Office Action for U.S. Appl. No. 17/156,233, by Liechti, Matthias Emanuel et al., mailed on Sep. 18, 2024, 24 pages.

(56) References Cited

OTHER PUBLICATIONS

Final Office Action for U.S. Appl. No. 17/225,715, by Liechti, Matthias Emanuel et al., mailed on Jan. 11, 2023, 22 pages.
Final Office Action for U.S. Appl. No. 17/672,670, by Liechti, Matthias Emanuel et al., mailed on Jan. 17, 2024, 22 pages.
Final Office Action for U.S. Appl. No. 17/672,670, by Liechti, Matthias Emanuel et al., mailed on Jul. 15, 2024, 22 pages.
Final Office Action for U.S. Appl. No. 17/672,670, by Liechti, Matthias Emanuel et al., mailed on May 4, 2023, 13 pages.
Final Office Action for U.S. Appl. No. 17/869,896, by Liechti, Matthias Emanuel et al., mailed on Jun. 18, 2024, 13 pages.
Final Office Action for U.S. Appl. No. 18/321, 159, by Liechti, Matthias Emanuel et al., mailed on Mar. 22, 2024, 18 pages.
Final Office Action for U.S. Appl. No. 18/321, 159, by Liechti, Matthias Emanuel et al., mailed on Nov. 7, 2024, 18 pages.
Fischman et al., "Ethical and practical issues involved in behavioral pharmacology research that administers drugs of abuse to human volunteers", Behavioural Pharmacology (1998); 9(7): 479-498. doi: 10.1097/00008877-199811000-00002.
Fisher et al., "Recovery rates in generalized anxiety disorder following psychological therapy: an analysis of clinically significant change in the STAI-T across outcome studies since 1990", Psychological Medicine (1999); 29(6): 1425-1434. doi: 10.1017/s0033291799001336.
Gaedigk. "Complexities of CYP2D6 gene analysis and interpretation", International Review of Psychiatry (2013); 25(5): 534-553. doi: 10.3109/09540261.2013.825581.
Gaedigk et al., "The CYP2D6 activity score: translating genotype information into a qualitative measure of phenotype", Clinical Pharmacology & Therapeutics (2008); 83(2): 234-242. doi: 10.1038/sj.clpt.6100406. Epub Oct. 31, 2007.
Gage et al., "Use of pharmacogenetic and clinical factors to predict the therapeutic dose of warfarin", Clinical Pharmacology & Therapeutics (2008); 84(3): 326-331. doi: 10.1038/clpt.2008.10. Epub Feb. 27, 2008. Erratum in: Clin Pharmacol Ther. Sep. 2008;84(3):430.
Garbrecht. "Synthesis of Amides of Lysergic Acid1", The Journal of Organic Chemistry (1959); 24(3): 368-372.
Garcia-Romeu et al., "Cessation and reduction in alcohol consumption and misuse after psychedelic use", Journal of Psychopharmacology (2019); 33(9): 1088-1101. doi: 10.1177/0269881119845793. Epub May 14, 2019.
Garcia-Romeu et al., "Psilocybin-occasioned mystical experiences in the treatment of tobacco addiction", Current Drug Abuse Reviews (2014); 7(3): 157-164. doi: 10.2174/1874473708666150107121331.
Genest et al., "Microcrystalloptic tests for lysergic acid diethylamide and other hallucinogens", Journal of Pharmacy and Pharmacology (1970); 22(11): 839-844. doi: 10.1111/j.2042-7158.1970.tb08449.x.
Ghasemi et al., "Association between serotonin 2A receptor genetic variations, stressful life events and suicide", Gene (2018); 658: 191-197. doi: 10.1016/j.gene.2018.03.023. Epub Mar. 9, 2018.
Glennon et al., "Antagonism of the Effects of the Hallucinogen Dom and the Purported 5-HT Agonist Quipazine by 5-HT 2 Antagonists", European Journal of Pharmacology (1983); 91(2-3): 189-196. doi: 10.1016/0014-2999(83)90464-8.
Golan et al., "Fingolimod increases brain-derived neurotrophic factor level secretion from circulating T cells of patients with multiple sclerosis", CNS Drugs (2019); 33: 1229-1237. doi: 10.1007/s40263-019-00675-7.
Golding et al., "Preparation of labeled aldehydes and ketones from enamides", Angew. Chem., Int. Ed. Engl.; (Germany, Federal Republic of) (1981); 20(1): 89-90.
Gong et al., "Serotonin receptor gene (HTR2A) T102C polymorphism modulates individuals' perspective taking ability and autistic-like traits", Frontiers in Human Neuroscience (2015); 9: 575; 8 pages. doi: 10.3389/fnhum.2015.00575.
Gouzoulis-Mayfrank et al., "Methodological issues of human experimental research with hallucinogens", Pharmacopsychiatry (1998); 31(S 2): 114-118. doi: 10.1055/s-2007-979356.

Griffiths et al., "Psilocybin can occasion mystical-type experiences having substantial and sustained personal meaning and spiritual significance", Psychopharmacology (2006); 187: 268-283. discussion 284-292. doi: 10.1007/s00213- 006-0457-5. Epub Jul. 7, 2006.
Griffiths et al., "Psilocybin occasioned mystical-type experiences: immediate and persisting dose-related effects", Psychopharmacology (2011); 218: 649-665. doi: 10.1007/s00213-011-2358-5. Epub Jun. 15, 2011.
Guglielmi et al., "Natural compounds and extracts as novel antimicrobial agents", Expert Opinion on Therapeutic Patents (2020); 30(12): 949-962. doi: 10.1080/13543776.2020.1853101.
Haile et al., "Plasma brain derived neurotrophic factor (BDNF) and response to ketamine in treatment-resistant depression", International Journal of Neuropsychopharmacology (2014); 17(2): 331-336. doi: 10.1017/S1461145713001119. Epub Oct. 8, 2013.
Hakulinen et al., "Serotonin receptor 1B genotype and hostility, anger and aggressive behavior through the lifespan: the Young Finns study", Journal of Behavioral Medicine (2013); 36: 583-590. doi: 10.1007/s10865-012-9452-y. Epub Sep. 4, 2012.
Halberstadt et al., "Pharmacological and biotransformation studies of 1-acyl-substituted derivatives of d-lysergic acid diethylamide (LSD)", Neuropharmacology (2020); 172: 107856; 11 pages. doi: 10.1016/j.neuropharm.2019.107856. Epub Nov. 19, 2019.
Halpern et al., "Do hallucinogens cause residual neuropsychological toxicity?", Drug and Alcohol Dependence (1999); 53(3): 247-256. doi: 10.1016/s0376-8716(98)00129-X.
Hamilton. "A rating scale for depression", Journal of Neurology, Neurosurgery, and Psychiatry (1960); 23(1): 56-62. doi: 10.1136/jnnp.23.1.56.
Hamilton. "Rating depressive patients", The Journal of Clinical Psychiatry (1980); 41(12 Pt 2): 21-24.
Hancock et al., "Characteristics and significance of the amorphous state in pharmaceutical systems", Journal of Pharmaceutical Sciences (Jan. 1997); 86(1):1-12.
Hashimoto et al., "Actions of D-lysergic acid diethylamide (LSD) and its derivatives on 5-hydroxytryptamine receptors in the isolated uterine smooth muscle of the rat", European Journal of Pharmacology (1977); 45(4): 341-348. doi: 10.1016/0014-2999(77)90273-4.
Hashimoto et al., "Effect of CYP2C polymorphisms on the pharmacokinetics of phenytoin in Japanese patients with epilepsy", Biological and Pharmaceutical Bulletin (1996); 19(8): 1103-1105. doi: 10.1248/bpb.19.1103.
Hasler et al., "Acute psychological and physiological effects of psilocybin in healthy humans: a double-blind, placebo-controlled dose-effect study", Psychopharmacology (2004); 172: 145-156. doi: 10.1007/s00213-003-1640-6. Epub Nov. 13, 2003.
He et al., "Catalytic asymmetric difunctionalization of stable tertiary enamides with salicylaldehydes: highly efficient, enantioselective, and diastereoselective synthesis of diverse 4-chromanol derivatives", Organic Letters (2014); 16(22): 5972-5975. doi: 10.1021/015029964. Epub Oct. 30, 2014.
Hicks et al., "Clinical Pharmacogenetics Implementation Consortium (CPIC) guideline for CYP2D6 and CYP2C19 genotypes and dosing of selective serotonin reuptake inhibitors", Clinical Pharmacology & Therapeutics (2015); 98: 127-134. doi: 10.1002/cpt. 147. Epub Jun. 29, 2015.
Hicks et al., "Clinical Pharmacogenetics Implementation Consortium guideline for CYP2D6 and CYP2C19 genotypes and dosing of tricyclic antidepressants", Clinical Pharmacology & Therapeutics (2013); 93(5): 402-408. doi: 10.1038/clpt.2013.2. Epub Jan. 16, 2013.
Hoehn et al., "Experimental evaluation of the generalized vibrational theory of G protein-coupled receptor activation", Proceedings of the National Academy of Sciences (2017); 114(22): 5595-5600. doi: 10.1073/pnas.1618422114. Epub May 12, 2017.
Hoffmann et al., "Synthesis and LSD-like discriminative stimulus properties in a series of N (6)-alkyl norlysergic acid N, N-diethylamide derivatives", Journal of Medicinal Chemistry (1985); 28(9): 1252-1255. doi: 10.1021/jm00147a022.
Hoffmann. "Synthesis and pharmacological evaluation of N (6)-alkyl norlysergic acid N, N-diethylamide derivatives", A Thesis

(56) References Cited

OTHER PUBLICATIONS submitted to the Faculty of Purdue University, In partial fulfillment of the Requirements for the Degree of Doctor of Philosophy (Aug. 1987); 24 pages.

Holze et al., "Safety pharmacology of acute LSD administration in healthy subjects", Psychopharmacology (2022): 1893-1905. doi: 10.1007/s00213-021-05978-6. Epub Sep. 13, 2021. Erratum in: Psychopharmacology (Berl). Feb. 2022;239(2):661. doi: 10.1007/s00213-021-05988-4.

Holze et al., "Direct comparison of the acute effects of lysergic acid diethylamide and psilocybin in a double-blind placebo-controlled study in healthy subjects", Neuropsychopharmacology (2022); 47(6): 1180-1187. doi: 10.1038/s41386-022-01297-2. Epub Feb. 25, 2022.

Houston et al., "Evaluation of genetic models for response in a randomized clinical trial of duloxetine in major depressive disorder", Psychiatry Research (2012); 200(1): 63-65. doi: 10.1016/j.psychres.2012.06.002. Epub Jun. 22, 2012.

Hu et al., "Synthesis and functional characterization of substituted isoquinolinones as MT2-selective melatoninergic ligands", Plos One (2014); 9(12): e113638; 26 pages. doi: 10.1371/journal.pone.0113638.

Huang et al., "Drug discrimination and receptor binding studies of N-isopropyl lysergamide derivatives", Pharmacology Biochemistry and Behavior (1994); 47(3): 667-673. doi: 10.1016/0091-3057(94)90172-4.

Huang et al., "Human 5-HT1A receptor C (- 1019) G polymorphism and psychopathology", International Journal of Neuropsychopharmacology (2004); 7(4): 441-451. doi: 10.1017/S1461145704004663. Epub Oct. 7, 2004.

Hutten et al., "Self-rated effectiveness of microdosing with psychedelics for mental and physical health problems among microdosers", Frontiers in Psychiatry (2019); 10: 672; 9 pages. doi: 10.3389/fpsyt.2019.00672.

Hutten et al., "Motives and side-effects of microdosing with psychedelics among users", International Journal of Neuropsychopharmacology (2019); 22(7): 426-434. doi: 10.1093/ijnp/pyz029.

Hutten et al., "P. 323 Cognitive and subjective effects of different low 'micro'doses of LSD in a placebo-controlled study", European Neuropsychopharmacology (2020); 31(S1): S63-S64.

Hysek et al., "Duloxetine inhibits effects of MDMA ("ecstasy") in vitro and in humans in a randomized placebo-controlled laboratory study", PloS One (2012); 7(5): e36476; 15 pages. doi: 10.1371/journal.pone.0036476. Epub May 4, 2012.

Hysek et al., "Effects of a β-blocker on the cardiovascular response to MDMA (ecstasy)", Emergency Medicine Journal (2010); 27(8): 586-589. doi: 10.1136/emj.2009.079905. Epub Apr. 8, 2010.

Hysek et al., "MDMA enhances emotional empathy and prosocial behavior", Social Cognitive and Affective Neuroscience (2014); 9(11): 1645-1652. doi: 10.1093/scan/nst161. Epub Oct. 4, 2013.

Ichikawa et al., "The effect of serotonin1A receptor agonism on antipsychotic drug-induced dopamine release in rat striatum and nucleus accumbens", Brain Research (2000); 858(2): 252-263. doi: 10.1016/s0006-8993(99)02346-x.

Inoue et al., "Effects of inducers and/or inhibitors on metabolism of lysergic acid diethylamide in rat liver microsomes", Xenobiotica (Dec. 1980); 10(12): 913-920. doi: 10.3109/00498258009033825.

Inoue et al., "Enzymic formation of dehydrogenated and hydroxylated metabolites from lysergic acid diethylamide by rat liver microsomes", Xenobiotica (May 1980); 10(5): 343-348. doi: 10.3109/00498258009033766.

International Preliminary Report on Patentability for International Application No. PCT/IB2022/051350, by Universitatsspital Basel, mailed Aug. 31, 2023, 10 pages.

International Preliminary Report on Patentability for International Application No. PCT/IB2022/051857, by Universitatsspital Basel, mailed Sep. 21, 2023, 8 pages.

International Preliminary Report on Patentability for International Application No. PCT/US2021/014721, by Universitatsspital Basel, mailed Sep. 9, 2022, 8 pages.

International Preliminary Report on Patentability for International Application No. PCT/US2021/026426, by Universitatsspital Basel, mailed Oct. 27, 2022, 10 pages.

International Preliminary Report on Patentability for International Application No. PCT/US2022/026274, by Mind Medicine, Inc., mailed Nov. 9, 2023, 11 pages.

International Preliminary Report on Patentability for International Application No. PCT/US2023/068668, by Mind Medicine, Inc., mailed Jan. 2, 2025, 10 pages.

International Search Report and Written Opinion for International Application No. PCT/IB2022/051350, by Universitatsspital Basel, mailed May 13, 2022, 15 pages.

International Search Report and Written Opinion for International Application No. PCT/IB2022/051857, by Universitatsspital Basel, mailed May 23, 2022, 11 pages.

International Search Report and Written Opinion for International Application No. PCT/US2021/014721, by Universitatsspital Basel, mailed Apr. 16, 2021, 10 pages.

International Search Report and Written Opinion for International Application No. PCT/US2022/026274, by Mind Medicine, Inc., mailed Sep. 6, 2022, 14 pages.

International Search Report and Written Opinion for International Application No. PCT/US2023/068668, by Mind Medicine, Inc., mailed Nov. 3, 2023, 11 pages.

International Search Report and Written Opinion for International Application No. PCT/US2024/059413, by Mind Medicine, Inc., mailed Jan. 16, 2025, 11 pages.

International Search Report and Written Opinion for International Application No. PCT/US2021/026426, by Universitatsspital Basel, mailed Sep. 9, 2021, 14 pages.

Isbell et al., "Studies on lysergic acid diethylamide (LSD-25): 1. Effects in former morphine addicts and development of tolerance during chronic intoxication", AMA Archives of Neurology & Psychiatry (1956); 76(5): 468-478.

Ishii et al., "Studies of lysergic acid diethylamide and related compounds. Part 8. Structural identification of new metabolites of lysergic acid diethylamide obtained by microbial transformation using Streptomyces roseochromogenes", Journal of the Chemical Society, Perkin Transactions 1 (1980); 4: 902-905.

Ishii et al., "Studies on lysergic acid diethylamide and related compounds. IX. Microbial transformation of amides related to lysergic acid diethylamide by Streptomyces roseochromogenes", Chemical and Pharmaceutical Bulletin (1979); 27(12): 3029-3038. doi.org/10.1248/cpb.27.3029.

Ishii et al., "Studies on lysergic acid diethylamide and related compounds. VII. Microbial transformation of lysergic acid diethylamide and related compounds", Chemical and Pharmaceutical Bulletin (1979); 27(7): 1570-1575. doi: 10.1248/cpb.27.1570.

Janke. "Die Eigenschaftsworterliste", Hogrefe: Gottingen, Section A (1978); pp. 9-18; 24 pages with English machine translation.

Johns Hopkins University, "Persisting Effects of Psilocybin" ClinicalTrials.gov ID NCT02971605 (2019) [online] https://classic.clinicaltrials.gov/ct2/show/NCT02971605?term=psilocybin&recrs=e&phase=1&draw=2&rank=13 (Retrieved from Sep. 10, 2019); 5 pages.

Johnson et al., "Emetic activity of reduced lysergamides", Journal of Medicinal Chemistry (1973); 16(5): 532-537. doi: 10.1021/jm00263a028.

Johnson et al., "Human hallucinogen research: guidelines for safety", Journal of Psychopharmacology (2008); 22(6): 603-620. doi: 10.1177/0269881108093587. Epub Jul. 1, 2008.

Johnson et al., "Potential therapeutic effects of psilocybin", Neurotherapeutics (2017); 14: 734-740. doi: 10.1007/s13311-017-0542-y.

Johnson et al., "Psilocybin dose-dependently causes delayed, transient headaches in healthy volunteers", Drug and Alcohol Dependence (2012); 123(1-3): 132-140. doi: 10.1016/j.drugalcdep.2011.10.029. Epub Nov. 29, 2011.

Karege et al., "Decreased serum brain-derived neurotrophic factor levels in major depressed patients", Psychiatry research (2002); 109(2): 143-148. doi: 10.1016/s0165-1781(02)00005-7.

Kargbo. "Current Trends in Psychedelic Science: Integrating Modified Lysergic Acid Derivatives and Psilocybin in Modern Medi-

(56) References Cited

OTHER PUBLICATIONS cine", ACS Medicinal Chemistry Letters (2024); 15(9): 1443-1445. doi: 10.1021/acsmedchemlett.4c00414.

Karst et al., "The non-hallucinogen 2-bromo-lysergic acid diethylamide as preventative treatment for cluster headache: an open, non-randomized case series", Cephalalgia (2010); 30(9): 1140-1144. doi: 10.1177/0333102410363490. Epub Mar. 26, 2010.

Kast et al., "Study of lysergic acid diethylamide as an analgesic agent", Anesthesia & Analgesia (1964); 43(3): 285-291.

Kast. "LSD and the dying patient", The Chicago Medical School Quarterly (1966); 26(2): 80-87.

Kühner et al., "Reliability and validity of the Revised Beck Depression Inventory (BDI-II) results from German samples", Der Nervenarzt (2007); 78: 651-656; 12 pages with English machine translation. doi: 10.1007/s00115-006-2098-7.

Kirchheiner et al., "CYP2D6 and CYP2C19 genotype-based dose recommendations for antidepressants: a first step towards subpopulation-specific dosages", Acta Psychiatrica Scandinavica (Sep. 2001); 104(3): 173-192. doi: 10.1034/j.1600-0447.2001.00299.x.

Kojima. "Aiming to improve the efficiency of product form selection in drug development", Journal of Pharmaceutical Science and Technology (Sep. 2008); 68(5): 344-349; 18 pages with English Translation.

Kometer et al., "Psilocybin biases facial recognition, goal-directed behavior, and mood state toward positive relative to negative emotions through different serotonergic subreceptors", Biological Psychiatry (2012); 72(11): 898-906. doi: 10.1016/j.biopsych.2012.04.005. Epub May 10, 2012.

Kraehenmann et al., "Psilocybin-induced decrease in amygdala reactivity correlates with enhanced positive mood in healthy volunteers", Biological Psychiatry (2015); 78(8): 572-581. doi: 10.1016/j.biopsych.2014.04.010. Epub Apr. 26, 2014.

Kulyashova et al., "Convenient modular construction of medicinally important 5-acylamino-4, 5-dihydroisoxazoles featuring four elements of diversity", Tetrahedron Letters (2016); 57(39): 4395-4397.

Kurland et al., "Psychedelic therapy utilizing LSD in the treatment of the alcoholic patient: a preliminary report", American Journal of Psychiatry (1967); 123(10): 1202-1209. doi: 10.1176/ajp.123.10.1202.

Kuypers et al., "Microdosing psychedelics: More questions than answers? An overview and suggestions for future research", Journal of Psychopharmacology (2019); 33(9): 1039-1057. doi: 10.1177/0269881119857204. Epub Jul. 14, 2019.

Laakmann et al., "Buspirone and lorazepam in the treatment of generalized anxiety disorder in outpatients", Psychopharmacology (1998); 136: 357-366. doi: 10.1007/s002130050578.

Lea et al., "Microdosing psychedelics: Motivations, subjective effects and harm reduction", International Journal of Drug Policy (2020); 75: 102600; 9 pages. doi: 10.1016/j.drugpo.2019.11.008. Epub Nov. 25, 2019.

Lea et al., "Perceived outcomes of psychedelic microdosing as self-managed therapies for mental and substance use disorders", Psychopharmacology (2020); 237: 1521-1532. doi: 10.1007/s00213-020-05477-0. Epub Feb. 11, 2020.

Leuner. "Basic functions involved in psychotherapeutic effects of psychotomimetics". In J. M. Shlien (Ed.), Research in Psychotherapy, American Psychological Association, Washington (1968); 466-470. doi.org/10.1037/10546-022.

Libanio et al., "Metabolism of lysergic acid diethylamide (LSD): an update", Drug Metabolism Reviews (2019); 51(3): 378-387. doi: 10.1080/03602532.2019.1638931. Epub Jul. 16, 2019.

Liechti et al., "Gender differences in the subjective effects of MDMA", Psychopharmacology (2001); 154: 161-168. doi: 10.1007/s002130000648.

Liester. "A review of lysergic acid diethylamide (LSD) in the treatment of addictions: historical perspectives and future prospects", Current Drug Abuse Reviews (2014); 7(3): 146-156. doi: 10.2174/1874473708666150107120522.

Lopresti et al., "Curcumin for the treatment of major depression: a randomised, double-blind, placebo controlled study", Journal of Affective Disorders (2014); 167: 368-375. doi: 10.1016/j.jad.2014.06.001. Epub Jun. 11, 2014.

Ludwig et al., "A clinical study of LSD treatment in alcoholism", American Journal of Psychiatry (1969); 126(1): 59-69. doi: 10.1176/ajp.126.1.59.

Luethi et al., "Monoamine transporter and receptor interaction profiles in vitro predict reported human doses of novel psychoactive stimulants and psychedelics", International Journal of Neuropsychopharmacology (2018); 21(10): 926-931. doi: 10.1093/ijnp/pyy047.

MacLean et al., "Factor analysis of the mystical experience questionnaire: A study of experiences occasioned by the hallucinogen psilocybin", Journal for the Scientific Study of Religion (2012); 51(4): 721-737. doi: 10.1111/j.1468-5906.2012.01685.x.

MacLean et al., "Mystical experiences occasioned by the hallucinogen psilocybin lead to increases in the personality domain of openness", Journal of Psychopharmacology (2011); 25(11): 1453-1461. doi: 10.1177/0269881111420188. Epub Sep. 28, 2011.

Madsen et al., "Correction: Psychedelic effects of psilocybin correlate with serotonin 2A receptor occupancy and plasma psilocin levels", Neuropsychopharmacology (2019); 44(7): 1328-1334. doi: 10.1038/s41386-019-0324-9. Epub Jan. 26, 2019. Erratum in: Neuropsychopharmacology. Jun. 2019;44(7):1336-1337. doi: 10.1038/s41386-019-0360-5.

Magano. "Large-scale amidations in process chemistry: practical considerations for reagent selection and reaction execution", Organic Process Research & Development (2022); 26(6): 1562-1689.

Mangini. "Treatment of alcoholism using psychedelic drugs: a review of the program of research", Journal of Psychoactive Drugs (1998); 30(4): 381-418. doi: 10.1080/02791072.1998.10399714.

McCamley et al., "Efficient N-demethylation of opiate alkaloids using a modified nonclassical Polonovski reaction", The Journal of Organic Chemistry (2003); 68(25): 9847-9850. doi: 10.1021/jo035243z.

Meiresonne et al., "Synthesis of 2-Fluoro-1, 4-benzoxazines and 2-Fluoro-1, 4-benzoxazepin-5-ones by Exploring the Nucleophilic Vinylic Substitution (SNV) Reaction of gem-Difluoroenamides", The Journal of Organic Chemistry (2015); 80(10): 5111-5124. doi: 10.1021/acs.joc.5b00507. Epub May 6, 2015.

Meuzelaar et al., "Synthesis of y-Unsaturated Enamides by N-Acylation of Imines Derived from y-Unsaturated Amines", Liebigs Annalen Recueil (1997); 1997(6): 1159-1163.

Mimura et al., "Trifluoroacetaldehyde: a useful industrial bulk material for the synthesis of trifluoromethylated amino compounds", Journal of Fluorine Chemistry (2010); 131(4): 477-486.

Mind Medicine Inc., "MindMed Acquires Exclusive License to Eight Clinical Trials of LSD, Partners with World-Leading Psychedelic Research Laboratory at University Hospital Basel", Press Release (Apr. 1, 2020) [online] https://web.archive.org/web/20201126173949/https://mindmed.co/news/press-release/mindmed-acquires-exclusive-license-to-eight-clinical-trials-of-lsd-partners-with-world-leading-psychedelic-research-laboratory-at-university-hospital-basel/; 22 pages.

Moliner et al., "Psychedelics promote plasticity by directly binding to BDNF receptor TrkB", Nature Neuroscience (2023); 26(6): 1032-1041. doi: 10.1038/s41593-023-01316-5. Epub Jun. 5, 2023.

Monte et al., "Stereoselective LSD-like activity in a series of d-lysergic acid amides of (R)-and (S)-2-aminoalkanes", Journal of Medicinal Chemistry (1995); 38(6): 958-966. doi: 10.1021/jm00006a015.

Moreno et al., "Safety, tolerability, and efficacy of psilocybin in 9 patients with obsessive-compulsive disorder", Journal of Clinical Psychiatry (Nov. 2006); 67(11): 1735-1740. doi: 10.4088/jcp.v67n1110.

Mueller et al., "Increased thalamic resting-state connectivity as a core driver of LSD-induced hallucinations", Acta Psychiatrica Scandinavica (2017); 136: 648-657. doi: 10.1111/acps.12818. Epub Sep. 21, 2017.

(56) References Cited

OTHER PUBLICATIONS

Muttoni et al., "Classical psychedelics for the Treatment of depression and anxiety: A Systematic Review", Journal of Affective Disorders (2019); 258: 11-24. doi: 10.1016/j.jad.2019.07.076. Epub Jul. 30, 2019.

Nakahara et al., "Studies on lysergic acid diethylamide and related compounds. 3. Improvement of amidation of lysergic acid (author's transl)", Yakugaku zasshi: Journal of the Pharmaceutical Society of Japan (1974); 94(3): 407-412. doi: 10.1248/yakushi1947.94.3_407.

Nakahara et al., "Studies on Lysergic Acid Diethylamide and Related Compounds. I. Synthesis of d-N6-Demethyl-lysergic Acid Diethylamide", Chemical and Pharmaceutical Bulletin (1971); 19(11): 2337-2341.

Nicholas et al., "High dose psilocybin is associated with positive subjective effects in healthy volunteers", Journal of Psychopharmacology (2018); 32(7): 770-778. doi: 10.1177/0269881118780713. Epub Jun. 27, 2018.

Nichols. "Chemistry and structure-activity relationships of psychedelics", Behavioral Neurobiology of Psychedelic Drugs (2018): 1-43.

Nichols. "Dark classics in chemical neuroscience: lysergic acid diethylamide (LSD)", ACS Chemical Neuroscience (2018); 9(10): 2331-2343. doi: 10.1021/acschemneuro.8b00043. Epub Mar. 1, 2018.

Nichols et al., "Stereoselective pharmacological effects of lysergic acid amides possessing chirality in the amide substituent", Behavioural Brain Research (1996); 73(1-2): 117-119. doi: 10.1016/0166-4328(96)00080-0.

Nichols et al., "Psychedelics as Medicines: An emerging new paradigm", Clinical Pharmacology and Therapeutics (2017); 101(2): 209-219.

Nichols, "Structure-activity relationships of serotonin 5-HT2A agonists", Wiley Interdisciplinary Reviews: Membrane Transport and Signaling (2012); 1(5): 559-579. doi/10.1002/wmts.42.

Non-Final Office Action for U.S. Appl. No. 17/156,233, by Liechti, Matthias Emanuel, et al., mailed on Jul. 6, 2022, 13 pages.

Non-Final Office Action for U.S. Appl. No. 17/156,233, by Liechti, Matthias Emanuel, et al., mailed on Jun. 27, 2023, 18 pages.

Non-Final Office Action for U.S. Appl. No. 17/156,233, by Liechti, Matthias Emanuel, et al., mailed on Jun. 6, 2024, 23 pages.

Non-Final Office Action for U.S. Appl. No. 17/225,715, by Liechti, Matthias Emanuel, et al., mailed on Sep. 23, 2022, 24 pages.

Non-Final Office Action for U.S. Appl. No. 17/672,670, by Liechti, Matthias Emanuel, et al., mailed on Apr. 18, 2024, 22 pages.

Non-Final Office Action for U.S. Appl. No. 17/672,670, by Liechti, Matthias Emanuel, et al., mailed on Mar. 3, 2023, 13 pages.

Non-Final Office Action for U.S. Appl. No. 17/672,670, by Liechti, Matthias Emanuel, et al., mailed on Sep. 8, 2023, 23 pages.

Non-Final Office Action for U.S. Appl. No. 17/729,205, by Levy, Daniel Emil et al., mailed on Sep. 25, 2024, 20 pages.

Non-Final Office Action for U.S. Appl. No. 17/869,896, by Liecheti, Matthias Emanuel, et al., mailed on Mar. 22, 2024, 16 pages.

Non-Final Office Action for U.S. Appl. No. 18/077,096, by Mack, Peter et al., mailed Feb. 4, 2025, 24 pages.

Non-Final Office Action for U.S. Appl. No. 18/321,159, by Liechti, Matthias Emanuel, et al., mailed on Dec. 13, 2023, 21 pages.

Non-Final Office Action for U.S. Appl. No. 18/321,159, by Liechti, Matthias Emanuel, et al., mailed on Jul. 9, 2024, 18 pages.

Non-Final Office Action for U.S. Appl. No. 18/336,724, by Liechti, Matthias Emanuel, et al., mailed Dec. 30, 2024, 26 pages.

North et al., "A new pragmatic design for dose escalation in phase 1 clinical trials using an adaptive continual reassessment method", BMC Cancer (2019); 19(632): 1-10. doi: 10.1186/s12885-019-5801-3.

Northcote. "Young adults' decision making surrounding heavy drinking: A multi-staged model of planned behaviour", Social Science & Medicine (2011); 72(12): 2020- 2025. doi: 10.1016/j.socscimed.2011.04.020. Epub May 18, 2011.

Notice of Allowance for U.S. Appl. No. 17/225,715, by Liechti, Matthias Emanuel et al., mailed on Apr. 19, 2023, 7 pages.

Notice of Allowance for U.S. Appl. No. 17/890,133 mailed Dec. 24, 2024, 11 pages.

Oberlender et al., "Stereoselective LSD-like activity in d-lysergic acid amides of R- and S-2-aminobutane", Journal of Medicinal Chemistry (1992); 35(2): 203-211. doi: 10.1021/jm00080a001.

Pahnke et al., "The experimental use of psychedelic (LSD) psychotherapy", Jama (1970); 212(11): 1856-1863.

Palhano-Fontes et al., "Rapid antidepressant effects of the psychedelic ayahuasca in treatment-resistant depression: a randomized placebo-controlled trial", Psychological Medicine (2019); 49(4): 655-663. doi: 10.1017/S0033291718001356. Epub Jun. 15, 2018.

Partial Supplementary European Search Report for European Application No. 22796524.1, by Mind Medicine, Inc., mailed Mar. 12, 2025, 16 pages.

Passie et al., "The pharmacology of hallucinogens", Principles of Addiction Medicine, 5th ed., Philadelphia: Wolters Kluwer Lippincott Williams & Wilkins (2014): 235-255.

Pfaff et al., "Lysergamides revisited", NIDA Research Monograph (1994); 146: 52-73.

Phan et al., "ALFA: Allele Frequency Aggregator", National Center for Biotechnology Information, US National Library of Medicine (2020) [online] .https://www.ncbi.nlm.nih.gov/snp/docs/gsr/alfa/ (Access Date: Mar. 20, 2025); 5 pages.

Polesskaya et al., "Allele C-specific methylation of the 5-HT2A receptor gene: Evidence for correlation with its expression and expression of DNA methylase DNMT1", Journal of Neuroscience Research (2006); 83(3): 362-373. doi: 10.1002/jnr.20732.

Polito et al., "A systematic study of microdosing psychedelics", PloS One (2019); 14(2): e0211023; 26 pages. doi: 10.1371/journal.pone.0211023.

Pollack. "Optimizing pharmacotherapy of generalized anxiety disorder to achieve remission", Journal of Clinical Psychiatry (2001); 62: 20-25.

Preissner et al., "Polymorphic cytochrome P450 enzymes (CYPs) and their role in personalized therapy", PloS One (2013); 8(12): e82562; 12 pages. doi: 10.1371/journal.pone.0082562.

Preller et al., "Effective connectivity changes in LSD-induced altered states of consciousness in humans", Proceedings of the National Academy of Sciences (2019); 116(7): 2743-2748. doi: 10.1073/pnas.1815129116. Epub Jan. 28, 2019.

Preller et al., "Role of the 5-HT2A Receptor in Self- and Other-Initiated Social Interaction in Lysergic Acid Diethylamide-Induced States: A Pharmacological fMRI Study", Journal of Neuroscience (Apr. 2018); 38(14): 3603-3611. doi: 10.1523/JNEUROSCI.1939-17.2018. Epub Mar. 19, 2018.

R Core Team. "R: A language and environment for statistical computing", Reference Index, Version 3.6.2 (2019); 3706 pages.

Reiff et al., "Psychedelics and psychedelic-assisted psychotherapy", American Journal of Psychiatry (2020); 177(5): 391-410. doi: 10.1176/appi.ajp.2019.19010035. Epub Feb. 26, 2020.

Requirement for Restriction/Election for U.S. Appl. No. 17/156,233, by Liechti, Matthias Emanuel, et al., mailed on Mar. 18, 2022, 10 pages.

Requirement for Restriction/Election for U.S. Appl. No. 17/729,205, by Levy, Daniel Emil et al., mailed on Jul. 2, 2024, 5 pages.

Riss et al., "A simple, rapid procedure for nucleophilic radiosynthesis of aliphatic [18 F] trifluoromethyl groups", Chemical Communications (2011); 47(43): 11873-11875. doi: 10.1039/c1cc15342k. Epub Oct. 11, 2011.

Roseman et al., "LSD alters eyes-closed functional connectivity within the early visual cortex in a retinotopic fashion", Human Brain Mapping (2016); 37(8): 3031-3040. doi: 10.1002/hbm.23224. Epub Apr. 29, 2016.

Roseman et al., "Quality of acute psychedelic experience predicts therapeutic efficacy of psilocybin for treatment-resistant depression", Frontiers in Pharmacology (2018); 8: 974; 10 pages. doi: 10.3389/fphar.2017.00974.

Ross. "Serotonergic hallucinogens and emerging targets for addiction pharmacotherapies," Psychiatric Clinics of North America (2012); 35(2): 357-374. doi: 10.1016/j.psc.2012.04.002.

Ross. "Microdosing psychedelics: Too much hype, almost no rigorous research", Journal of Psychopharmacology (2019); 33(9): 1050-1051.

(56) References Cited

OTHER PUBLICATIONS

Sachse et al., "Cytochrome P450 2D6 variants in a Caucasian population: allele frequencies and phenotypic consequences", American Journal of Human Genetics (1997); 60(2): 284-295.

Sachse et al., "Functional significance of a C→A polymorphism in intron 1 of the cytochrome P450 CYP1A2 gene tested with caffeine", British Journal of Clinical Pharmacology (1999); 47(4): 445-449. doi: 10.1046/j.1365-2125.1999.00898.x.

Sanches et al., "Antidepressant effects of a single dose of ayahuasca in patients with recurrent depression: a SPECT study", Journal of Clinical Psychopharmacology (2016); 36(1): 77-81. doi: 10.1097/JCP.0000000000000436.

Savage. "Lysergic acid diethylamide (LSD-25) a clinical-psychological study", American Journal of Psychiatry (1952); 108(12): 896-900. doi: 10.1176/ajp.108.12.896.

Schmid et al., "Acute subjective effects in LSD-and MDMA-assisted psychotherapy", Journal of Psychopharmacology (2021); 35(4): 362-374. doi: 10.1177/0269881120959604. Epub Oct. 8, 2020.

Schmid et al., "CYP2D6 function moderates the pharmacokinetics and pharmacodynamics of 3, 4-methylene-dioxymethamphetamine in a controlled study in healthy individuals", Pharmacogenetics and Genomics (2016); 26(8): 397-401. doi: 10.1097/FPC.0000000000000231.

Schmidt et al., "Acute LSD effects on response inhibition neural networks", Psychological Medicine (2018); 48(9): 1464-1473. doi: 10.1017/S0033291717002914. Epub Oct. 2, 2017.

Schmidt et al., "The NMDA antagonist ketamine and the 5-HT agonist psilocybin produce dissociable effects on structural encoding of emotional face expressions", Psychopharmacology (2013); 225: 227-239. doi: 10.1007/s00213-012-2811-0. Epub Jul. 27, 2012.

Schmitz et al., "The symptom check-list-90-R (SCL-90-R): a German validation study", Quality of Life Research (2000); 9: 185-193. doi: 10.1023/a:1008931926181.

Scully. "A Sketch of the Early History of Underground LSD Manufacturing", In Breaking Convention 2013, University of Greenwich (2013); 7 pages.

Seaich. "The Far-Off Land: An Experience with LSD (exp88502)", Erowid.org, erowid.org/exp/88502 (Apr. 4, 2018) [online] https://www.erowid.org/experiences/exp.php?ID=88502 (Access Date: Feb. 13, 2025); 8 pages.

Shahid et al., "State-Trait Anxiety Inventory (STAI)", Stop, That and One Hundred Other Sleep Scales (2012); p. 367-368; 11 pages.

Shulgin et al.; "Pihkal: A Chemical Love Story," Transform Press, Berkeley, CA; 1991:453-923.

Smith et al., "141. The alkaloids of ergot. Part V. The nature of ergine", Journal of the Chemical Society (Resumed) (1934): 674-675.

Smith et al., "311. The alkaloids of ergot. Part VII. iso Ergine and iso lysergic acids", Journal of the Chemical Society (Resumed) (1936): 1440-1444.

Smith. "LSD" in "Psychedelic Chemistry", Loompanics Unlimited, Port Townsend, Washington (1981); 216 pages.

Speth et al., "Decreased mental time travel to the past correlates with default-mode network disintegration under lysergic acid diethylamide", Journal of Psychopharmacology (2016); 30(4): 344-353. doi: 10.1177/0269881116628430.

Spieß et al., "Direct synthesis of enamides via electrophilic activation of amides", Journal of the American Chemical Society (2021); 143(28): 10524-10529. doi: 10.1021/jacs.1c04363. Epub Jul. 7, 2021.

Spielberger et al., "Development of the Spanish edition of the state-trait anxiety inventory", Interamerican Journal of Psychology (1971); 5(3-4): 145-158.

Spielberger et al., "Manual for the state-trait anxiety inventory", State-Trait Anxiety Inventory (Form Y), Palo Alto, CA: Consulting Psychologists (1983); 4 pages.

Spielberger. "State-Trait Anxiety Inventory for Adults", Mind Garden, Inc. (2018); 1 page.

Spravato (esketamine) nasal spray, CIII, Nasal Spray: 28 mg of esketamine per device. Each nasal spray device delivers two sprays containing a total of 28 mg of esketamine; Highlights of Prescribing Information, Medication Guide approved by the U.S. Food and Drug Administration; Revised: Jul. 2020 (Jul. 2020), Initial U.S. Approval: 1970 (ketamine), Reference ID: 4649523, Manufactured for: Janssen Pharmaceuticals, Inc., Titusville, NJ 08560; 44 pages.

Strassman. "Adverse reactions to psychedelic drugs. A review of the literature", The Journal of Nervous and Mental Disease (1984); 172(10): 577-595. doi: 10.1097/00005053-198410000-00001.

Strassman. "Human Hallucinogen Interactions with Drugs Affecting Serotonergic", Neuropsychopharmacology (1992); 7(3): 241-243.

Studerus et al., "Acute, subacute and long-term subjective effects of psilocybin in healthy humans: a pooled analysis of experimental studies", Journal of Psychopharmacology (2011); 25(11): 1434-1452. doi: 10.1177/0269881110382466. Epub Sep. 20, 2010.

Studerus et al., "Prediction of psilocybin response in healthy volunteers", Plos One (2012); 7(2): e30800; 12 pages. doi: 10.1371/journal.pone.0030800. Epub Feb. 17, 2012.

Takada et al., "API form screening and selection in drug discovery stage", Pharm Stage (Jan. 15, 2007); 6(10): 20-25; 9 pages with English Translation.

Taniguchi et al., "7-endo selective aryl radical cyclization onto enamides leading to 3-benzazepines: concise construction of a cephalotaxine skeleton", The Journal of Organic Chemistry (2005); 70(5): 1922-1925. doi: 10.1021/jo040264u.

Uhle. "Amino Derivatives of 5-KETO-1, 3, 4, 5-TETRAHYDROBENZ [cd] INDOLE1", Journal of the American Chemical Society (1951); 73(5): 2402-2403.

U.S. Appl. No. 19/020,135, filed Jan. 14, 2025, by Liechti et al.

Valle et al., "Inhibition of alpha oscillations through serotonin-2A receptor activation underlies the visual effects of ayahuasca in humans", European Neuropsychopharmacology (2016); 26(7): 1161-1175. doi: 10.1016/j.euroneuro.2016.03.012. Epub Mar. 25, 2016.

Vippagunta et al., "Crystalline solids", Advanced Drug Delivery Reviews (2001); 48(1): 3-26. doi: 10.1016/s0169-409x(01)00097-7.

Vizeli et al., "Pharmacogenetics of ecstasy: CYP1A2, CYP2C19, and CYP2B6 polymorphisms moderate pharmacokinetics of MDMA in healthy subjects", European Neuropsychopharmacology (2017); 27(3): 232-238. doi: 10.1016/j.euroneuro.2017.01.008. Epub Jan. 20, 2017.

Vizeli et al., "Role of serotonin transporter and receptor gene variations in the acute effects of MDMA in healthy subjects", ACS Chemical Neuroscience (2018); 10(7): 3120-3131. doi: 10.1021/acschemneuro.8b00590. Epub Jan. 10, 2019.

Vollenweider et al., "5-HT modulation of dopamine release in basal ganglia in psilocybin-induced psychosis in man—a PET study with [11C] raclopride", Neuropsychopharmacology (1999); 20(5): 424-433. doi: 10.1016/S0893-133X(98)00108-0.

Vollenweider et al., "Psilocybin induces schizophrenia-like psychosis in humans via a serotonin-2 agonist action", Neuroreport (1998); 9(17): 3897-3902. doi: 10.1097/00001756-199812010-00024.

Vollenweider et al., "Psychedelic drugs: neurobiology and potential for treatment of psychiatric disorders", Nature Reviews Neuroscience (2020); 21(11): 611-624. doi: 10.1038/s41583-020-0367-2. Epub Sep. 14, 2020.

Wagmann et al., "In vitro metabolic fate of nine LSD-based new psychoactive substances and their analytical detectability in different urinary screening procedures", Analytical and Bioanalytical Chemistry (2019); 411: 4751-4763. doi: 10.1007/s00216-018-1558-9. Epub Jan. 7, 2019.

Werk et al., "Functional gene variants of CYP3A4", Clinical Pharmacology & Therapeutics (2014); 96(3): 340-348. doi: 10.1038/clpt.2014.129. Epub Jun. 13, 2014.

Weston et al., "Historic psychedelic drug trials and the treatment of anxiety disorders", Depression and Anxiety (2020); 37(12): 1261-1279. doi: 10.1002/da.23065. Epub Jul. 5, 2020.

White et al., "Personality and the subjective effects of acute amphetamine in healthy volunteers", Neuropsychopharmacology (2006); 31(5): 1064-1074. doi: 10.1038/sj.npp.1300939.

William. "Tramatic Brain Injury Cured With Time and This Substance: An Experience with LSD (exp110850)", Erowid.org, erowid.

(56) References Cited

OTHER PUBLICATIONS org/exp/110850 (May 30, 2018) [online] https://www.erowid.org/experiences/exp.php?ID=110850 (Access Date: Feb. 13, 2025); 2 pages.
Xu et al., "A convenient synthesis of N-vinyl enamides via the lithiation and ring-opening reaction of 2-phenyl-2-oxazolines", Tetrahedron Letters (2017); 58(18): 1788-1791.
Yadav et al., "Co-crystals: a novel approach to modify physicochemical properties of active pharmaceutical ingredients", Indian Journal of Pharmaceutical Sciences (2009); 71(4): 359-370. doi: 10.4103/0250-474X.57283.
Yoshida et al., "Decreased serum levels of mature brain-derived neurotrophic factor (BDNF), but not its precursor proBDNF, in patients with major depressive disorder", PLOS One (2012); 7(8): e42676; 6 pages. doi: 10.1371/journal.pone.0042676. Epub Aug. 3, 2012. Erratum in: PLOS One. 2013;8(2). doi:10.1371/annotation/85a3fa48-980b-4f95-bb43-b33b1c3e0ac6.
[Author Unknown, Date Unknown] Fragebogen zur Selbstheschreibung, STAI-G Form X 1, STAI-G Form X 2; 8 pages with English Translation.
Cerny et al., "Mutterkornalkaloide XIX. Über die Verwendung von N, N'-Carbonyldiimidazol zur Synthese der D-Lysergsäure-, D-Dihydrolysergsäure (I)-und 1-Methyl-D-dihydrolysergsäure (I) amide", Collection of Czechoslovak Chemical Communications (1962); 27(7): 1585-1592; 17 pages with English machine translation.
Ereshefsky et al., "Antidepressant Drug Interactions and the Cytochrome P450 System", Clinical Pharmacokinetics (1995); 29(Suppl 1): 10-19. doi: 10.2165/00003088-199500291-00004.
Fadiman. "The psychedelic explorer's guide: Safe, therapeutic, and sacred journeys", Simon and Schuster, Park Street Press (2011); Part Two, Chapters 5 and 8; Part Three: Chapters 9, 11, 13; Part 5: Chapters 21 and 22; pp. 71-82, 103-113, 119-135, 144-166, 178-182, and 282-302; 103 pages total.
Fehr et al., "Demethylation of lysergic acid skeleton", Helvetica Chimica Acta (1970); 53(8): 2197-2201; 10 pages with English machine translation. doi: 10.1002/hlca.19700530832.
Franke. "Symptom-Checkliste von LR Derogatis: SCL-90-R; deutsche Version: Beltz Test", (2002); 680 pages with English machine translation.
Gasser. "Die psycholytische therapie in der Schweiz von 1988-1993", Archives Suisses de Neurologie et de Psychiatrie (1996); 147: 59-66; 14 pages with English machine translation.
Invitation to Pay Additional fees for International Application No. PCT/US2021/026426, by Universitatsspital Basel, mailed Jun. 17, 2021, 2 pages.
Keks et al., "Switching and stopping antidepressants", Australian Prescriber, Australian Government—Publishing Service, Canberra, AU (Jun. 2016); 39(3): 76-83. doi: 10.18773/austprescr.2016.039. Epub Jun. 1, 2016.
Kim et al., "Structure of a hallucinogen-activated Gq-coupled 5-HT2A serotonin receptor", Cell (2020); 182(6): 1574-1588. doi: 10.1016/j.cell.2020.08.024.
Leuner. "State of development of guided affective imagery", Zeitschrift fur Psychotherapie und medizinische Psychologie (1969); 19(5): 177-187; 22 pages with English machine translation.
Niwaguchi. "Application of GC/MS to studies on the metabolism of dependence causing drugs. Lysergic acid diethylamide (LSD) and amphetamines", Iyo Masu Kenkyukai Koenshu (1979); 4: 75-82 with English abstract.
Non-Final Office Action for U.S. Appl. No. 17/685,138, by Liechti, Matthias Emanuel, et al., mailed Mar. 26, 2025, 20 Pages.
Stachulski et al., "Stereochemical and NMR Reassignment of 6-Norlysergic Acid Diethylamide and 6-Nor-6-allyllysergic Acid Diethylamide", Journal of Chemical Research (1996); S1: 30-31.
Stoll et al., "Amide der stereoisomeren Lysergsäuren und Dihydrolysergsäuren. 38. Mitteilung über Mutterkornalkaloide", Helvetica Chimica Acta (1955); 38(2): 421-433; 26 pages with English machine translation.
Stoll et al., "Partialsynthese von alkaloiden vom typus des ergobasins. (6. Mitteilung über Mutterkornalkaloide)", Helvetica Chimica Acta (1943); 26(3): 944-965; 48 pages with English machine translation.
Rigsbee. "Polymorph Investigation of Lysergic Acid Diethylamide (LSD) D-Tartrate", Triclinic Labs Scientific Report (Dec. 28, 2021); 43 pages.
Abramson et al., "Lysergic acid diethylamide (LSD-25): I. Physiological and perceptual responses." The Journal of Psychology. Jan. 1955; 39(1):3-60.
[Author Unknown] "How to Microdose: A Step by Step Guide—Microdosing information, research, community, coaching and more." Microdosing Institute (2021) [online] https://web.archive.org/web/20210430131601/https://microdosinginstitute.com/how-to/how-to-microdose/; 9 pages.
[Author Unknown] "What are Medication Blister Packs?", Drug Package LLC (Nov. 30, 2022) [online] https://web.archive.org/web/20221130004940/https://drugpackage.com/whats-new/ [Access Date: Feb. 1, 2023); 4 pages.
Caffrey et al., "The art and science of drug titration." Therapeutic Advances in Drug Safety. Sep. 2020;11:1-14.
Canal CE. "Serotonergic psychedelics: experimental approaches for assessing mechanisms of action." In New Psychoactive Substances: Pharmacology, Clinical, Forensic and Analytical Toxicology, Springer International Publishing. Mar. 13, 2018; 227-260.
Isbell et al., "Cross Tolerance Between LSD and Psilocybin." Psychopharmacologia. May 1961;2(3):147-59.
Kuypers KP, "The therapeutic potential of microdosing psychedelics in depression." Therapeutic Advances in Psychopharmacology. Aug. 2020; 10: 1-15.
Lṕpez-Giménez et al., "Hallucinogens and serotonin 5-HT 2A receptor-mediated signaling pathways." Curr Top Behav Neurosci. Jan. 1, 2018;36:45-73.
Niwaguchi et al., "Studies on Screening Test for Lysergic Acid Diethylamide by Test Paper." Proceedings of the Japan Academy. 1970;46(6):583-586.
Rosenberg et al., "Observations on direct and cross tolerance with LSD and d-amphetamine in man." Psychopharmacologia. Jan. 1963;5(1):1-5.
Rosenberg et al., "The effect of N, N-dimethyltryptamine in human subjects tolerant to lysergic acid diethylamide." Psychopharmacologia. May 1964;5(3):217-227.
Stoll WA, "Lysergsaure-diathylamid, ein Phantastikum aus der Mutterkorngruppe . . " Schweize Arch Neurol Psychair (Swiss Archives of Neurology and Psychiatry). 1947; 60:279-323; 48 pages with English Abstract.
Ungerleider J. Thomas "Chapter IV The acute side effects from LSD." in The Problems and Prospects of LSD. 1968: 61-68; 10 total pages.
Wolbach et al., "Cross tolerance between mescaline and LSD-25 with a comparison of the mescaline and LSD reactions." Psychopharmacologia. Jan. 1962;3(1):1-4.
Dissanayaka et al., "Anxiety rating scales in Parkinson's disease: a critical review updating recent literature", International Psychogeriatrics (2015); 27(11): 1777-1784. doi: 10.1017/S1041610215000885. Epub Jun. 23, 2015.
Donzuso et al., "The neuroanatomical correlates of anxiety in a healthy population: differences between the State-Trait Anxiety Inventory and the Hamilton Anxiety Rating Scale", Brain and Behavior (2014); 4(4): 504-514. doi: 10.1002/brb3.232. Epub Jun. 18, 2014.
Extended European Search Report for European Application No. 22859127.7, by Mind Medicine, Inc., mailed Jun. 4, 2025, 11 pages.
Extended European Search Report for European Application No. 22859135.0, by Mind Medicine, Inc., mailed Jul. 1, 2025, 8 pages.
Karlin et al., "MM120 (Lysergide) for GAD: Results From Mindmed's Phase 2 Trial", 2024 ASCP Annual Meeting, Innovations in Clinical Research: Broadening Clinical Trial Methods, Endpoints and Goals, Abstract Book, Miami Beach, Florida (May 28-31, 2024); pp. 42-43; 3 total pages.
Schell. "Defying Industry Setbacks, MindMed Advances Psychedelic To Phase 0001", Clinical Leader (Jul. 17, 2024) [online] https://www.clinicalleader.com/doc/defying-industry-setbacks-mindmed-advances-psychedelic-to-phase-0001; 2 pages.

(56) References Cited

OTHER PUBLICATIONS

Shulgin et al., "TIHKAL: The Continuation", Transform Press, Berkeley, CA (1997); pp. 159-191, 346-383, 592-611, 728-773; 152 total pages.

Arrnbrecht et al. "Economic and humanistic burden associated with depression and anxiety among adults with non-communicable chronic diseases (NCCDs) in the United States." Journal of Multidisciplinary Healthcare. Apr. 2021:887-896. doi:10.2147/JMDH.5280200.

Baldwin et al. "Evidence-based pharmacological treatment of generalized anxiety disorder." International Journal of Neuropsychopharmacology. Jun. 2011; 14(5):697-710. doi: 10.1017/S1461145710001434.

Bang et al. "Assessment of blinding in clinical trials." Controlled Clinical Trials. Apr. 2004;25(2):143-156. doi: 10.1016/j.cct2003.10.016.

Barrera et al. "Quality of life impairment in generalized anxiety disorder, social phobia, and panic disorder." Journal of Anxiety Disorders. Dec. 2009;23(8):1086-1090. doi: 10.1016/j.janxdis.2009.07.011.

Carl et al. "Psychological and pharmacological treatments for generalized anxiety disorder (GAD): a meta-analysis of randomized controlled trials." Cognitive Behaviour Therapy. Jan. 2020;49(1):1-21. doi: 10.1080/16S06073.2018.1560358.

Clayton et al. "Comparison of sexual functional in clinical and nonclinical populations using the changes in Sexual Functioning Questionnaire (CSFQ)." Psychopharmacology Bulletin. Jan. 1997;33(4):731-745.

Cohen et al. "Placebo response mitigation with a participant-focused psychoeducational procedure: a randomized, single-blind, all placebo study in major depressive and psychotic disorders." Neuropsychopharmacology. Mar. 2021;46(4):844-850. doi: 10.1038/s41386-020-00911-5.

Daly et al. "Efficacy and safety of intranasal esketamine adjunctive to oral antidepressant therapy in treatment-resistant depression: a randomized clinical trial." JAMA Psychiatry. Feb. 2018; 75(2):139-148. doi: 10.1001/jamapsychiatry.2017.3739.

Das et al. " Lysergic acid diethylamide: a drug of 'use' ?. " Therapeutic Advances in Psychopharmacology. Jun. 2016;6(3):214-228. doi: 10.1177/2045125316640440.

Desseilles et al. "Massachusetts General Hospital Safer criteria for clinical trials and research." Harvard Review of Psychiatry. Sep. 2013;21(5):269-274. doi: 10.1097/HRP.0b013e3182a75cc7.

Eli Lilly "FDA Approves Cymbalta for Treatment of Generalized Anxiety Disorder." Eli Lilly [news release]. Feb. 26, 2007; 3 pages. [retrieved online] [retrieved on Oct. 15, 2025]. < URL: https://investor.lilly.com/static-files/499f0aa3-281f-49f4-9655-049aae179593>.

Garakani et al. "Pharmacotherapy of Anxiety Disorders: Current and Emerging Treatment Options." Focus, American Psychiatric Publishing. Jun. 2021; 19(2):222-242. doi: 10.1176/appi.focus.19203.

Goldberg et al. "The experimental effects of psilocybin on symptoms of anxiety and depression: A meta-analysis." Psychiatry Research. Feb. 2020;284:112749, 4 pages.

Hamilton MA. "The assessment of anxiety states by rating." British Journal of Medical Psychology. Mar. 2, 1959;32:81-82.

Jacobsen et al. "Rapid and Durable Response to a Single Dose of MM120 (Lysergide) in Generalized Anxiety Disorder: A Dose Optimization Study." [poster] Interdisciplinary Conference on Psychedelic Research, Jun. 6-8, 2024, Haarlem, Netherlands; 1 page.

Jauhar et al. "Esketamine for treatment resistant depression." BMJ. Sep. 2019;366:15572, 2 pages. doi: 10.1136/bmj.l5572.

Kaiser et al. "Unraveling the comorbidity of depression and anxiety in a large inpatient sample: Network analysis to examine bridge symptoms." Depression and Anxiety. Mar. 2021;38(3):307-317. doi: 10.1002/da.23136.

Keller et al. "Reliability and construct validity of the Changes in Sexual Functioning Questionnaire short-form (CSFQ-14)." Journal of Sex & Marital Therapy. Jan. 2006;32(1):43-52. oi: 10.1080/00926230500232909.

Machado-Vieira et al. "The timing of antidepressant effects: a comparison of diverse pharmacological and somatic treatments." Pharmaceuticals. Jan. 2010;3(1):19-41. doi: 10.3390/ph3010019.

Matza et al. "Identifying HAM-A cutoffs for mild, moderate, and severe generalized anxiety disorder." International Journal of Methods in Psychiatric Research. Dec. 2010;19(4):223-232. doi: 10.1002/mpr.323.

Mora et al. "Lessons learned from placebo groups in antidepressant trials." Philosophical Transactions of the Royal Society B: Biological Sciences. Jun. 2011;366(1572):1879-1888. doi: 10.1098/rstb.2010.0394.

Morean et al. "The drug effects questionnaire: psychometric support across three drug types." Psychopharmacology. May 2013;227(1):177-192. doi: 10.1007/s00213-012-2954-z.

Newman et al. "Worry and generalized anxiety disorder: a review and theoretical synthesis of evidence on nature, etiology, mechanisms, and treatment." Annual Review of Clinical Psychology. Mar. 2013;9(1):275-297. doi: 10.1146/annurev-clinpsy-050212-185544.

Non-Final Office Action for U.S. Appl. No. 17/890,198, by Mack, Peter et al., mailed on Sep. 17, 2025, 22 pages.

Patriquin et al. "The neurobiological mechanisms of generalized anxiety disorder and chronic stress." Chronic Stress. May 2017;1:1-10. doi: 10.1177/2470547017703993.

Reilly et al. "The validity and reproducibility of a work productivity and activity impairment instrument." Pharmacoeconomics. Nov. 1993;4(5):353-365. doi: 10.2165/00019053-199304050-00006.

Robinson et al. "Single Treatment with MM120 (Lysergide) in Generalized Anxiety Disorder." JAMA. Sep. 2025:E1-E15. doi: 10.1001/jama.2025.13481.

Strawn et al. "Pharmacotherapy for generalized anxiety disorder in adult and pediatric patients: an evidence-based treatment review." Expert Opinion on Pharmacotherapy. Jul. 2018; 19(10):1057-1070. doi: 10.1080/146S6S66.2018.1491966.

U.S. Appl. No. 19/276,575, by Mack, Peter et al., filed on Jul. 22, 2025.

Williams et al. "Development and reliability of a structured interview guide for the Montgomery Åsberg Depression Rating Scale (SIGMA)." Br J Psychiatry. Jan. 2008;192(1):52-58. doi: 10.1192/bjp.bp.106.032532.

Haddjeri et al. "Effect of sustained administration of the 5-HT1A receptor agonist flesinoxan on rat 5-HT neurotransmission." European Neuropsychopharmacology. Sep. 1, 1999;9(5):427-440. doi: 10.1016/s0924-977x(99)00020-6.

\* cited by examiner

D-LSD D-Tartrate

LYOPHILIZED ORALLY DISINTEGRATING TABLET FORMULATIONS OF D-LYSERGIC ACID DIETHYLAMIDE FOR THERAPEUTIC APPLICATIONS

BACKGROUND OF THE INVENTION

1. Technical Field

The present invention relates to the formulation of drugs. More specifically, the present invention relates to an immediate release formulation for a pharmaceutical formulation of d-lysergic acid diethylamide (LSD).

2. Background Art

Oral solution formulations are convenient for studies in a small number of sites and with a limited number of patients, mainly early phase development studies, but may not be suitable for later phase development studies run in many centers and across wide geographies nor for commercialization due to challenges in product stability and supply chain, such as the potential requirement for cold chain storage.

Solid oral formulations as tablets or capsules are more common in later phase clinical development and commercially due to advantages in production, supply chain, and patient convenience. Solid oral formulations can be immediate release, dissolving instantaneously in the mouth or stomach, or extended release in which the drug release is prolonged over time.

Orally disintegrating tablets (ODTs) are another solid dosage form which is formulated with the aim of increasing the dissolution rate of a pharmaceutical product and promoting pre-gastric absorption. In order to achieve rapid disintegration rates, the ODT formulation must provide high porosity, low density, and a low hardness (Berthoumieu et al., 2010; Bandari et al., 2008). This dosage form can be chosen to modify absorption or for patient populations that have difficulty in swallowing (Lindgren et al., 1993), and is also suitable for use in geriatric and pediatric patients, or for those who suffer from conditions such as dysphagia (Sastry et al., 2000).

From the perspectives of cost and simplicity, direct compression is a common method for preparing ODTs. However, the disintegration capacity of ODTs produced in this way is limited by the size and hardness of the resulting tablets. An alternative method for preparing ODTs is freeze drying. For example, the ZYDIS® ODT (orally dissolving tablet) fast-dissolve formulation, is a freeze-dried oral solid dosage form that disperses almost instantly in the mouth with no water required.

LSD is derived from its German name LysergSaureDiethylamid (Lysergic acid diethylamide). Lysergide belongs to a family of indole alkylamines that includes numerous substituted tryptamines such as psilocin (the active moiety of psilocybin) and N,N-dimethyltryptamine (DMT). The IUPAC name for LSD is 9,10-didehydro-N,N-diethyl-6-methylergoline-8β-carboxamide.

LSD can be used to assist psychotherapy for many indications including anxiety, depression, addiction, personality disorder, and others and can also be used to treat other disorders such as cluster headache, migraine, and others (Passie et al., 2008; Hintzen et al., 2010; Nichols, 2016; Liechti, 2017). Effects of LSD can include altered thoughts, feelings, awareness of surroundings, dilated pupils, increased blood pressure, and increased body temperature. Therapeutic use of LSD is showing promising results for treating various neurological and behavioral disorders. However, due to its potency there can be challenges in developing and manufacturing solid oral formulations of LSD that meet pharmaceutically acceptable limits for content uniformity and chemical stability.

Clinical studies with LSD have focused on oral solution drug product forms. There has been little to no formulation development work with LSD. Oral solutions were used historically and almost all the old studies and anecdotal data are with oral solutions or impregnated papers/cartons.

There is a need for an LSD dosage form and drug product that is both commercially attractive to a broad patient population and meets regulatory/quality expectations for suitability and robustness. A commercially viable solid oral, immediate release pharmaceutical formulation of d-Lysergic Acid Diethylamide (LSD), as a free base or in a salt form, does not currently exist as a marketed product or reported in literature. With the expected therapeutic dose of LSD to be in the 10's to 100's of micrograms, challenges exist for achieving acceptable drug content uniformity and chemical stability. Furthermore, previous studies have shown LSD in oral solution is not stable at room temperature (Holze et al 2019).

In addition to achieving a uniform and stable immediate release drug product formulation, the final drug product should be in a form that is easily administered to a broad range of patient populations, including, but not limited to the elderly, pediatrics, and patients with a condition that may limit their ability to swallow.

SUMMARY OF THE INVENTION

The present invention provides a solid oral immediate release formulation of LSD, including LSD formulations intended for an orally disintegrating tablet dosage form, wherein the composition is produced by lyophilization of a feedstock in a pre-formed mold to form an orally disintegrating tablet.

The present invention further provides a method of making a solid oral immediate release formulation of LSD by lyophilizing a flash frozen stock solution of LSD and excipients of a non-gelling matrix former, filler, binder, and buffer as well as additional excipients such as antioxidants, photostabilization agents, permeation enhancers and flavoring agents, in a pre-formed mold, and forming an orally disintegrating tablet.

The present invention also provides for a method of treating an individual by administering a solid oral immediate release formulation of LSD, wherein the composition is produced by lyophilization of a feedstock in a pre-formed mold to form an orally disintegrating tablet and treating the individual.

DESCRIPTION OF THE DRAWINGS

Other advantages of the present invention are readily appreciated as the same becomes better understood by reference to the following detailed description when considered in connection with the accompanying drawings wherein.

DETAILED DESCRIPTION OF THE INVENTION

Figure 1:
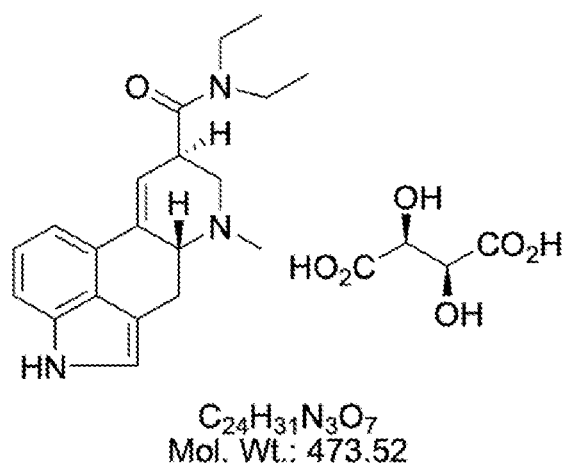
FIG. 1 is a representation of D-LSD D-tartrate salt.

The present invention provides for a solid oral formulation of LSD in a quick or immediate release dosage form such as an orally disintegrating tablet. The term "quick release tablet" is a mechanism that (similar to immediate-release dosage) delivers a drug immediately in contrast with a delay after its administration (delayed-release dosage) or for a prolonged period of time (extended-release (ER, XR, XL) dosage) or to a specific target in the body (targeted-release dosage). Preferably, it refers to minimal time dependent release in oral dose formulations. The present invention provides a composition, preferably including LSD as its active, or one of its active ingredients, that dissolve relatively quickly once orally ingested. This provides an easy to administer yet anticipated to be effective and efficacious therapeutic effect. The composition is preferably produced by lyophilization of a feedstock in a pre-formed mold to form the orally disintegrating tablet.

The LSD can be in a free base form or a salt form as a crystalline or non-crystalline solid. The salt can be, but is not limited to, hydrochloride, hydrobromide, maleate, tartrate (including D-tartrate and meso-tartrate), citrate, phosphate, fumarate, sulfate, mesylate, acetate, oxalate, benzoate, benzensulfonate, xinafoate, 1,5-Napthalene disulfonate, ascorbate, and naphthalene-2-sulfonate. The dose of LSD can preferably be 0.01-1 mg (10-1000 µg). However, dosing can be adjusted depending on indication, age, weight, and other factors affecting the pharmacology, physiology, and drug/drug interactions in a given patient.

The preferred solid oral formulation is an orally disintegrating tablet (ODT) such as using ZYDIS® (Catalent, Inc.) technology, described in U.S. Pat. No. 9,192,580 B2, which is herein incorporated by reference. This is further shown in EXAMPLE 1. Typical ZYDIS® ODT formulations include a non-gelling matrix former, filler, binder, and pH modifying agent (i.e., buffer). In addition, antioxidants, photostabilization agents, permeation enhancers, coloring agents, and sweeteners/flavoring agents can be included in ZYDIS® ODT formulations.

Examples of non-gelling matrix formers used include, but are not limited to, non-gelling gelatin (including fish gelatin), maltodextrin, modified starches, starch ethers, low molecular weight dextrans, and low to intermediate molecular weight cellulose gums (U.S. Pat. No. 10,548,839 B2).

Examples of fillers used include lactose (including anhydrous), mannitol, dicalcium phosphate, calcium sulfate, starch (starch as used herein can include dry or pre-gelled), cellulose (including microcrystalline cellulose), kaolin, sodium chloride, sorbitol, trehalose, sucrose, etc.

Examples of binders include acacia gum, methylcellulose, hydroxypropyl methylcellulose, hydroxypropyl cellulose, tragacanth, polyvinyl pyrrolidone (PVP), starch, etc.

Buffer is added to target the formulation to a specific pH. Currently, three buffers, citrate, phosphate, and acetate, make up the majority of buffers used in parenteral pharmaceuticals approved by the FDA, but less precedented excipients are certainly available to use in commercial dosage forms. The pH of a formulation alternatively can be adjusted with unbuffered acid (i.e., hydrochloric acid) or unbuffered base (i.e., sodium hydroxide).

Antioxidants can be added to the formulation in order to minimize degradation due to oxidative stress. The term oxidation can be defined as the incorporation of oxygen into the structure of a drug, or as the process of converting one chemical substance into another derivative bearing a smaller number of electrons. Examples of such antioxidants are ascorbic acid, citric acid, butylated hydroxy anisole (BHA), and butylated hydroxyl toluene (BHT).

Many drugs are sensitive to light and therefore their formulated products can degrade during manufacturing, storage, and administration. The photostability of a drug substance can be defined as the response of the drug or drug product to the exposure to solar, UV, and visible light in the solid, semisolid, or liquid state that leads to a physical or chemical change. Undo light exposure can result in potency loss, altered efficacy, and adverse biological effects. Various additives or encapsulation methods and compositions can be used to protect the active product from light in order to minimize any degradation due to light exposure (i.e., photostabilization agents).

Photo degradation can also occur in combination with oxygen exposure, resulting in photo-oxidation degradation. Some of the commonly used antioxidants to protect against photo-oxidation are ascorbic acid, α-tocopherol, butylated hydroxyanisole (BHA), butylated hydroxytoluene (BHT), L-histidine, propyl gallate, and sulfur compounds. Ascorbic acid, α-tocopherol, β-carotene, and BHT act as free radical scavengers and singlet oxygen quenchers and thus inhibit the photosensitization reactions. If a drug substance acts as a photosensitizer and initiates a chain reaction in the drug product, some of the excipients can be oxidized, while the drug can be protected from photodegradation.

The formulation can also contain permeability enhancers to increase the extent and/or rate of absorption. Examples of such enhancers are sulphoxides (such as dimethylsulphoxide, DMSO), azones (e.g., laurocapram), pyrrolidones (for example 2-pyrrolidone, 2P), alcohols and alkanols (ethanol, or decanol), glycols (for example propylene glycol, PG, a common excipient in topically applied dosage forms), surfactants (also common in dosage forms) and terpenes.

Coloring agents, sweeteners, and flavoring agents can also be added to solid oral formulations in order to improve patient recognition and acceptability.

The compound of the present invention is administered and dosed considering the clinical condition of the individual patient, the site and method of administration, scheduling of administration, patient age, sex, body weight and other factors known to medical practitioners. The pharmaceutically "effective amount" for purposes herein is thus determined by such considerations as are known in the art. The amount must be effective to achieve improvement including but not limited to improved survival rate or more rapid recovery, or improvement or elimination of symptoms and other indicators as are selected as appropriate measures by those skilled in the art.

In the method of the present invention, the compound of the present invention can be administered in various ways. It should be noted that it can be administered as the compound and can be administered alone or as an active ingredient in combination with pharmaceutically acceptable carriers, diluents, adjuvants, and vehicles. The patient being treated is a warm-blooded animal and, in particular, mammals including man. The pharmaceutically acceptable carriers, diluents, adjuvants, and vehicles generally refer to inert, non-toxic solid or liquid fillers, diluents or encapsulating material not reacting with the active ingredients of the invention.

The doses can be single doses or multiple doses over a period of several days. The treatment generally has a length proportional to the length of the disease process and drug effectiveness and the patient species being treated.

Absorption of the active drug can be targeted. Drug absorption is determined by the drug's physicochemical properties, formulation, and route of administration. Dosage forms (e.g., tablets, capsules, solutions), consisting of the drug plus other ingredients, are formulated to be given by various routes (e.g., oral, buccal, sublingual, rectal, parenteral, topical, inhalational). Regardless of the route of administration, drugs must be in solution to be absorbed. Thus, solid forms (e.g., tablets, capsules) must be able to disintegrate and deaggregate. Solid oral tablets and capsule formulations typically have gastric absorption, whereas an ODT formulation can be formulated to target pre-gastric or buccal absorption which can further enhance bioavailability.

The present invention provides for a method of making a solid oral immediate release formulation of LSD, as a free base or in a salt form, by lyophilizing a flash frozen stock solution of drug and excipients (i.e., non-gelling matrix former, filler, binder, and buffer as well as optional additional excipients such as antioxidants, photostabilization agents, permeation enhancers and flavoring agents as described above) in a pre-formed mold to form an orally disintegrating tablet. This approach considers the challenges associated with formulating a low dose product while maintaining content uniformity and chemical integrity of LSD.

The present invention provides for a method of treating an individual, by administering a solid oral immediate release formulation of LSD of an orally disintegrating tablet, wherein the composition is produced by lyophilization of a feedstock in a pre-formed mold to form the orally disintegrating tablet and treating the individual.

The condition or disease being treated can include, but is not limited to, anxiety disorders (including anxiety in advanced stage illness e.g. cancer, as well as generalized anxiety disorder), depression (including postpartum depression, major depressive disorder and treatment-resistant depression), headache disorder (including cluster headaches and migraine headache), obsessive compulsive disorder (OCD), personality disorders (including conduct disorder), stress disorders (including adjustment disorders and post-traumatic stress disorder), drug disorders (including alcohol dependence or withdrawal, nicotine dependence or withdrawal, opioid dependence or withdrawal, cocaine dependence or withdrawal, methamphetamine dependence or withdrawal), other addictions (including gambling disorder, eating disorders, and body dysmorphic disorder), pain, neurodegenerative disorders (such as dementia, Alzheimer's Disease, Parkinson's Disease), autism spectrum disorder, eating disorders, or neurological disorders (such as stroke). The individual can have trouble swallowing or be elderly.

The invention is further described in detail by reference to the following experimental examples. These examples are provided for the purpose of illustration only and are not intended to be limiting unless otherwise specified. Thus, the invention should in no way be construed as being limited to the following examples, but rather, should be construed to encompass any and all variations which become evident as a result of the teaching provided herein.

Figure 2:
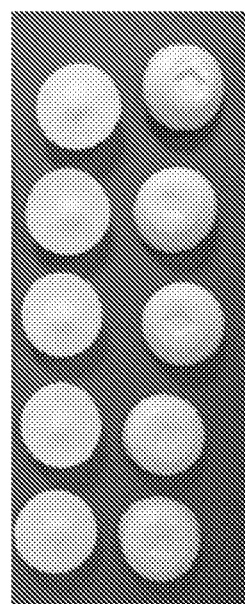
FIG. 2 is a photograph of ZYDIS® ODT containing LSD.

Example 1: Lyophilization of d-LSD D-Tartrate Stock Solution to Formulate an Orally Disintegrating Tablet Solid oral formulations of d-LSD D-tartrate in a fast dispersing orally disintegrating tablet (ODT) were produced the following method: A) Generating a formula stock solution containing d-LSD D-tartrate, a non-gelling matrix forming excipient, a filler excipient, and a binding agent fully dissolved in water; B) Dosing the stock solution in pre-formed molds; and C) Lyophilizing the dosed formulations to remove water by sublimation. Formulation compositions are provided in TABLE 1. Images for Formulation 1 are shown in FIG. 2. All formulations disintegrated in less than 60 seconds demonstrating immediate release.

| Component | Formulation 1 | Formulation 2 | Formulation 3 | Approximate Wt % |
|---|---|---|---|---|
| Drug | | d-LSD D-tartrate | | <1% |
| Non-gelling matrix | Fish Gelatin | Maltodextrin | | 2-10% |
| Binder | | | Methylcellulose | 1-5% |
| Filler | Mannitol | Mannitol | Trehalose | 2-10% |
| Solvent | | Water | | qs to 100% |

These formulations were protected from moisture ingress, set on stability at 40° C., and after one month tested for chemical degradation. The total chemical impurities are presented in TABLE 2. These results show minor changes in total impurities after one month stored at accelerated conditions, demonstrating the suitability of lyophilized ODT formulations of d-LSD D-tartrate.

TABLE 2

Total Impurities of lyophilized d-LSD D-tartrate formulations after one month storage at 40° C.

| Time point | Formulation 1 | Formulation 2 | Formulation 3 |
|---|---|---|---|
| T = 0 | 0.9% impurity | 0.3% impurity | 0.7% impurity |
| T = 1 mo @ 40° C. | 1.6% impurity | 0.2% impurity | 0.5% impurity |

Throughout this application, various publications, including United States patents, are referenced by author and year and patents by number. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. A composition of a solid oral immediate release formulation of LSD, consisting of LSD or a salt thereof contained within an immediate release dosage form of an orally disintegrating tablet, wherein said composition is produced by lyophilization of a single feedstock in a pre-formed mold to form the orally disintegrating tablet, wherein said feedstock consists of LSD or a salt thereof; a non-gelling matrix former of maltodextrin; a filler chosen from the group consisting of lactose, mannitol, dicalcium phosphate, calcium sulfate, starch, cellulose, kaolin, sodium chloride, sorbitol, trehalose, and sucrose; water; and 1-5% weight percent of a binder of hydroxypropyl methylcellulose, and wherein said LSD or salt thereof is present at less than 1% weight percent within said feedstock and there is content uniformity of LSD or salt thereof within said tablet.

2. A method of making a solid oral immediate release formulation of LSD, consisting of the steps of:
lyophilizing a single flash frozen stock solution consisting of LSD or a salt thereof, water, and excipients of a non-gelling matrix former of maltodextrin, filler, 1-5% weight percent a binder of hydroxypropyl methylcellulose, and buffer in a pre-formed mold; and forming an orally disintegrating tablet, wherein the LSD or salt thereof is present at less than 1% weight percent within the stock solution and wherein there is content uniformity of LSD or salt thereof within the tablet.

3. The method of claim 2, wherein the filler is chosen from the group consisting of lactose, mannitol, dicalcium phosphate, calcium sulfate, starch, cellulose, kaolin, sodium chloride, sorbitol, trehalose, and sucrose.

4. The method of claim 2, wherein the buffer is chosen from the group consisting of citrate, phosphate, and acetate.

5. The method of claim 2, wherein the LSD is in a salt form and the salt is chosen from the group consisting of hydrochloride, hydrobromide, maleate, tartrate, citrate, phosphate, fumarate, sulfate, mesylate, acetate, and oxalate.

6. A method of treating an individual, including the steps of:
 administering a solid oral immediate release formulation of LSD of an orally disintegrating tablet, wherein the orally disintegrating tablet is produced by lyophilization of a single feedstock in a pre-formed mold to form the orally disintegrating tablet, wherein said feedstock consists of LSD or a salt thereof, water, a non-gelling matrix former of maltodextrin, a filler, and 1-5% weight percent of a binder of hydroxypropyl methylcellulose, and wherein the LSD or salt thereof is present at less than 1% weight percent of said feedstock and there is content uniformity of LSD or salt thereof within the tablet; and
 treating the individual.

7. The method of claim 6, wherein the individual has trouble swallowing, is elderly, or has dementia.

8. The method of claim 6, wherein said treating step is further defined as treating a condition or disease chosen from the group consisting of anxiety disorders, depression, headache disorder, obsessive compulsive disorder (OCD), personality disorders, stress disorders, drug disorders, gambling disorder, eating disorder, body dysmorphic disorder, pain, neurodegenerative disorders, autism spectrum disorder, eating disorders, and neurological disorders.

9. The method of claim 6, wherein the LSD is in a salt form and the salt is chosen from the group consisting of hydrochloride, hydrobromide, maleate, tartrate, citrate, phosphate, fumarate, sulfate, mesylate, acetate, and oxalate.

10. The method of claim 6, wherein said administering step is further defined as administering 0.01-1 mg of LSD.

* * * * *